(12) United States Patent
Katsuragi

(10) Patent No.: US 9,457,606 B2
(45) Date of Patent: Oct. 4, 2016

(54) TREATMENT LIQUID, INK SET, AND INKJET RECORDING METHOD

(71) Applicant: Koji Katsuragi, Kanagawa (JP)

(72) Inventor: Koji Katsuragi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/658,487

(22) Filed: Mar. 16, 2015

(65) Prior Publication Data

US 2015/0258833 A1 Sep. 17, 2015

(30) Foreign Application Priority Data

Mar. 17, 2014 (JP) .................. 2014-053007

(51) Int. Cl.
| | | |
|---|---|---|
| *B41M 5/52* | (2006.01) | |
| *C09D 11/30* | (2014.01) | |
| *B41M 5/00* | (2006.01) | |
| *C09D 11/322* | (2014.01) | |
| *C09D 11/40* | (2014.01) | |
| *C09D 11/54* | (2014.01) | |

(52) U.S. Cl.
CPC .......... *B41M 5/0017* (2013.01); *C09D 11/322* (2013.01); *C09D 11/40* (2013.01); *C09D 11/54* (2013.01)

(58) Field of Classification Search
CPC ................................ C09D 11/30; B41M 5/52
USPC ......................................... 524/377, 388, 548
See application file for complete search history.

(56) References Cited

U.S. PATENT DOCUMENTS

2012/0092413 A1 4/2012 Kawamura
2013/0266748 A1* 10/2013 Oguri ..................... B41M 5/529
428/32.34
2013/0321524 A1 12/2013 Katsuragi
2013/0321525 A1* 12/2013 Fujii .................... B41M 5/0011
347/21
2014/0125731 A1 5/2014 Katsuragi

FOREIGN PATENT DOCUMENTS

| JP | 2004-243624 | 9/2004 |
|---|---|---|
| JP | 3618825 | 11/2004 |
| JP | 2012-086380 | 5/2012 |
| JP | 2012-126056 | 7/2012 |

OTHER PUBLICATIONS

U.S. Appl. No. 14/326,808, filed Jul. 9, 2014.
U.S. Appl. No. 14/326,837, filed Jul. 9, 2014.
U.S. Appl. No. 14/063,375, filed Oct. 25, 2013.

* cited by examiner

*Primary Examiner* — James J Seidleck
*Assistant Examiner* — Deve E Valdez
(74) *Attorney, Agent, or Firm* — Cooper & Dunham LLP

(57) ABSTRACT

A treatment liquid, which contains a water-soluble organic solvent, at least two cationic resins, and water, wherein the cationic resins have a cationization degree of 4 meq/g or greater at pH of 4.0, and a repeating unit represented by the following structural formula 1:

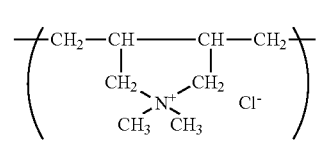

Structural Formula 1 and the cationic resins have mutually different weight average molecular weights in the range of 5,000 to 25,000.

6 Claims, 7 Drawing Sheets

Conveying direction

TREATMENT LIQUID, INK SET, AND INKJET RECORDING METHOD

BACKGROUND OF THE INVENTION

1. Field of the Invention

The present invention relates to a treatment liquid for inkjet recording, an ink set, and an inkjet recording method.

2. Description of the Related Art

It has been generally known in an inkjet recording system that a treatment liquid is applied on a recording medium in advance, and a colorant in an aqueous recording ink is aggregated by bringing the treatment liquid with the aqueous recording ink, in order to improve image density. As for a component for aggregating a colorant in an aqueous recording ink, for example, a cationic resin is known. The cationic resin has an index, which is called a cationization degree, and indicates the strength of cationy. The ability of aggregating a colorant in an aqueous recording ink is higher, as the cationization degree is higher. On the other hand, the high cationization degree causes a demerit, such as stronger irritation and sensitization to skin. However, an ink causes a defect, called beading, where adjacent dots are blended to each other, particularly when a recording ink of non-ink absorbency or low absorbency is used, unless the ink contains a cationic resin having a high cationization degree. When cationic resins having the same peaks in the molecular weight distributions thereof are used in a treatment liquid, a smooth film is formed on a surface of a recording medium. Therefore, a friction coefficient between the recording media is high when the recording media are brought into contact with each other, which causes problems, such as an image formed on the recording medium is smeared, and the recording medium itself is torn.

For example, the liquid composition disclosed in Japanese Patent Application Laid-Open (JP-A) No. 2012-126056, and a print pretreatment liquid disclosed in JP-A No. 2004-243624 each contain one cationic resin. Therefore, they cause problems, such as smearing of an image on a recording medium, and tearing the recording medium itself, when they are used particularly on the recording medium of a non-ink absorbency, or low absorbency.

Moreover, the liquid composition disclosed in Japanese Patent (JP-B) No. 3618825 contains two types of cationic resins each having different peaks of the molecular weight distribution, but has a problem in safety, as the molecular weight of the one cationic resin is 1,000 or less.

Moreover, JP-A No. 2012-086380 discloses a treatment liquid containing two-types of cationic resins.

None of the aforementioned literatures describes a cationization degree of a cationic resin for use, and an amount of the cationic resin used therein is 20% by mass at most. Therefore, beading occurs, when the treatment liquid is used particularly on a recording medium of non-ink absorbency, or low absorbency.

SUMMARY OF THE INVENTION

The present invention aims to provide a treatment liquid for inkjet recording, which can secure safety to skin, while maintaining the ability of aggregating a colorant, achieve abrasion resistance of a recording medium to which an aqueous recording ink is applied, improves image density and beading resistance, reduce a friction coefficient between recording media, and lower a corrosion level of a metal member.

As a result of studies diligently conducted by the present inventors, it has been found that the aforementioned problems can be solved with the following treatment liquid, by which the present invention is accomplished.

Specifically, the present invention is as follows.

(1) A treatment liquid, containing:
  a water-soluble organic solvent;
  at least two cationic resins; and
  water,
  wherein the cationic resins have a cationization degree of 4 meq/g or greater at pH of 4.0, and a repeating unit represented by the following structural formula 1

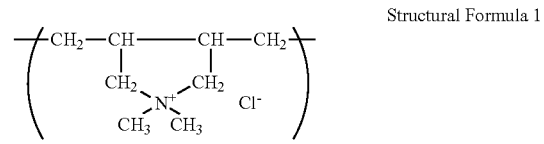

Structural Formula 1 and the cationic resins have mutually different weight average molecular weights in the range of 5,000 to 25,000.

Figure 1:
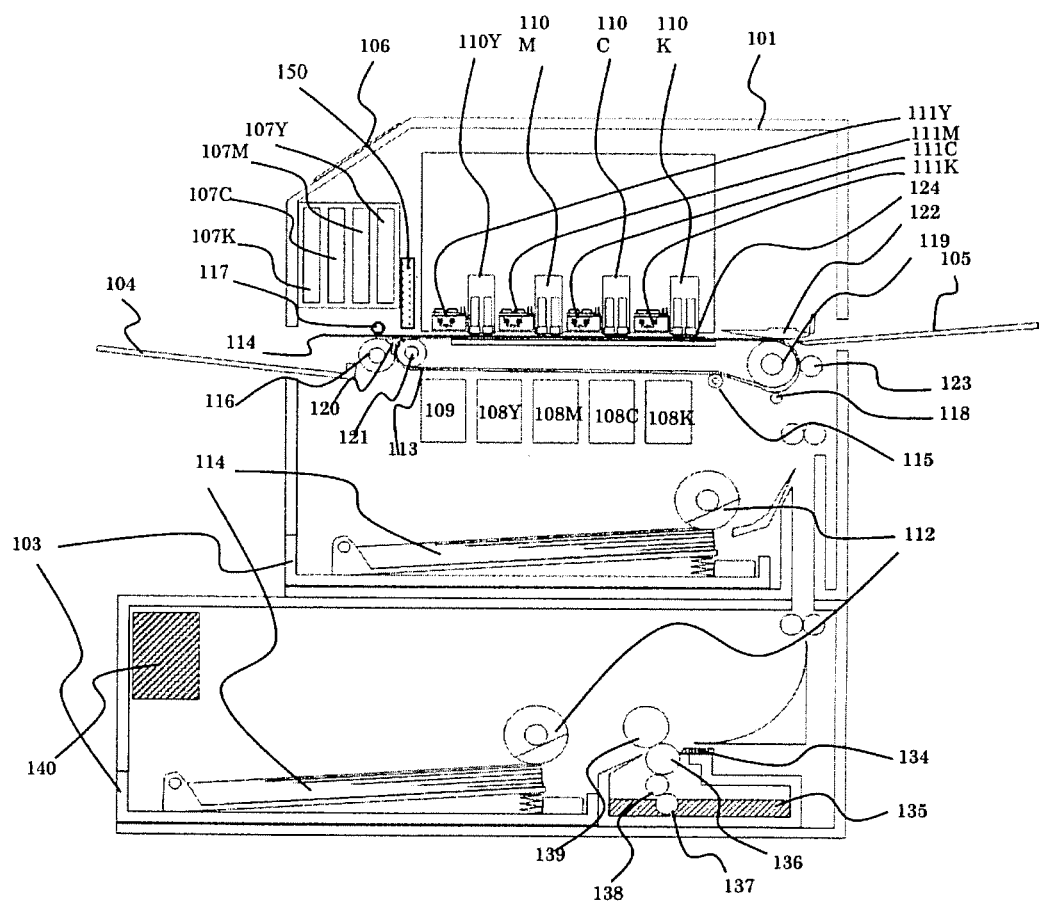
FIG. 1 is a schematic diagram (side explanatory view) illustrating one example of an inkjet recording device for use in the present invention.

DETAILED DESCRIPTION OF THE INVENTION (Treatment Liquid)

The treatment liquid of the present invention contains a water-soluble organic solvent, cationic resins, and water, and may further contain other components as necessary.

<Cationic Resin>

As for the cationic resins, it is important that the cationic resins to be contained are at least two cationic resins, which have a cationization degree of 4 meq/g or greater at pH of 4.0, and a repeating unit represented by the following structural formula 1, and have mutually different weight average molecular weights in the range of 5,000 to 25,000.

A colorant in an aqueous recording ink is aggregated, as the cationic resins react with a carboxyl group-containing resin contained in the aqueous recording ink. As a result, effects of preventing beading and improving the image density can be expected.

The cationic resins for use in the treatment liquid of the present invention are used for aggregating the colorant contained in the aqueous recording ink, and the cationization degree of each cationic resin is 4 meq/g or greater at the pH of 4.0. When the cationization degree is 4 meq/g or greater at the pH of 4.0, an effect of aggregating a colorant is sufficiently exhibits, and beading where adjacent dots are blended to each other is prevented. Moreover, use of such the treatment liquid can prevent irritation or sensitization to a skin, and can prevent corrosion of a member of a treatment liquid applying device.

When the cationization degree is very high, a problem may be caused in terms of safety. The cationization degree at the pH of 4.0 is preferably 4 meq/g to 15 meq/g, more preferably 4 meq/g to 10 meq/g, and particularly preferably 4 meq/g to 7.5 meq/g. When the cationization degree is within the preferable range, the object of the present invention is achieved, and moreover a treatment liquid having excellent safety can be provided.

Note that, the cationic resin containing the repeating unit represented by the following structural formula 1 is typically used for cosmetic products, and is highly safe.

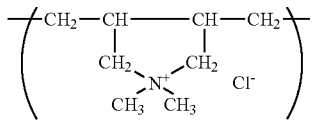

Structural Formula 1

The cationization degree is determined by colloidal titration using a potassium polyvinyl sulfate reagent. Specifically, the cationization degree is determined in the following manner.

A conical beaker is charged with 90 mL of deionized water. To this, 10 mL of a 500 ppm sample (dry basis) aqueous solution is added, and the pH is adjusted to 4.0 with a hydrochloric acid solution, followed by stirring the resulting mixture for about 1 minutes. Subsequently, 2 to 3 drops of a toluidine blue indicator to the mixture, and the resultant is titrated with a N/400 potassium polyvinyl sulfate reagent (N/400PVSK). The titration speed is set to 2 mL/min, and the point at which the sample water is changed the color from blue to reddish purple and the color is maintained for 10 seconds or longer is determined as the endpoint. The cationization degree can be determined by the following equation.

Cationization degree (meq/g)=(N/400PVSK titration amount)×(titer of N/400PVSK)/2

The higher the cationization degree is, stronger the cationic property is, and more sufficiently react with a colorant contained in an aqueous recording ink. As a result, an amount of the treatment liquid required can be reduced, and a high quality image can be obtained without causing curling of a recording medium, or cockling.

The weight average molecular weight of the cationic resin having the repeating unit represented by the structural formula 1 is in the range of 5,000 to 25,000. When the weight average molecular weight of the cationic resin is 5,000 or greater, a permeation level of the resulting treatment liquid to skin or various members can be suppressed, and therefore skin irritation or skin sensitization, and corrosion of a member can be prevented. When the weight average molecular weight of the cationic resin is 25,000 or less, the viscosity of the treatment liquid can be adjusted to a target value.

In the present invention, two or three cationic resins each having the repeating unit represented by the structural formula 1, and having the weight average molecular weight of 5,000 to 25,000 are used. When only one cationic resin is used, a layer of the treatment liquid formed on a recording medium becomes a smooth layer. As a result, a friction coefficient between recording media becomes high when recording media are closely attached to each other, such as roll paper, or when a recording medium of non-ink absorbency or low absorbency is used, and hence the recording medium itself may be torn. Accordingly, in the present invention, two or more cationic resins each having the repeating unit represented by the structural formula 1, and having mutually different the weight average molecular weight, which is in the range of 5,000 to 25,000, are used in the treatment liquid. When the treatment liquid is applied, therefore, irregularities are formed at a surface of the treatment liquid, to thereby prevent adhesion between the recording media. When a difference in the weight average molecular weight is small, an effect of preventing the adhesion between recording media becomes small. Therefore, the difference in the weight average molecular weight is preferably at least 5,000 or greater.

The treatment liquid of the present invention preferably further contain a cationic resin having the repeating unit represented by the following structural formula 2, other than the cationic resins having the repeating unit represented by the structural formula 1. As the cationic resin having the repeating unit represented by the structural formula 2 is used in combination, precipitation of crystals derived from the cationic resin having the repeating unit represented by the structural formula 1 can be suppressed. Similarly to the cationic resin having the repeating unit represented by the structural formula 1, the cationization degree of the cationic resin having the repeating unit represented by the structural formula 2 is preferably 4 meq/g or greater at pH of 4.0. As a result, the cationic resin having the repeating unit represented by the structural formula 2 inhibits beading as well as suppressing precipitation of crystals derived from the cationic resin having the repeating unit represented by the structural formula 1. The weight average molecular weight of the cationic resin having the repeating unit represented by the structural formula 2 is preferably in the range of 3,000 to 6,000.

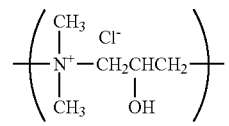

Structural Formula 2

A total amount of the cationic resins containing the repeating unit represented by the structural formula 1 and the cationic resin having the repeating unit represented by the structural formula 2 in the treatment liquid is preferably 10% by mass to 50% by mass, more preferably 10% by mass to 40% by mass, and particularly preferably 30% by mass to 40% by mass. As for a ratio between the cationic resins each having the repeating unit represented by the structural formula 1 and the cationic resin having the repeating unit represented by the structural formula 2, the ratio of the cationic resin having the repeating unit represented by the structural formula 2 to the cationic resins each having the repeating unit represented by the structural formula 1 is preferably 1% by mass to 30% by mass, more preferably 2.5% by mass to 20% by mass, and even more preferably 2.5% by mass to 10% by mass.

Examples of a commercial product of the cationic resin having the repeating unit represented by the structural formula 1 include SHALLOL series manufactured by DAI-ICHI KOGYO SEIYAKU CO., LTD., UNISENCE FPA series manufactured by SENKA Corporation, and Polyamine series manufactured by Nitto Boseki Co., Ltd. Medical Co., Ltd. Examples of a commercial product of the cationic resin having the repeating unit represented by the structural formula 2 include UNISENCE KITE series manufactured by SENKA Corporation, and Catiomaster series manufactured by Yokkaichi Chemical Company, Limited.

In order to improve the abrasion resistance and curling resistance of a recording medium, the treatment liquid of the present invention preferably further contain at least one selected from the group consisting of an epoxidized polyamide resin, a melamine formaldehyde resin, and a urea resin, in addition to the cationic resins. These resins are typically used as paper strength agents. Therefore, abrasion resistance and curl resistance can be improved by adding these resins to the treatment liquid. In addition, tearing or breaking of a recording medium caused when winding the medium into roll paper, to which a tension is applied, is prevented. Among them, the epoxidized polyamide resin is particularly preferable, because the epoxidized polyamide resin has cationic characteristic. Because of the cationic property thereof, a colorant in an aqueous recording ink is aggregated with the resin, and a secondary amine site forms crosslink upon application of heat. Therefore, further improvement of the abrasion resistance can be expected when the epoxidized polyamide resin is used.

An amount of the epoxidized polyamide resin, the melamine formaldehyde resin, and/or the urea resin in the treatment liquid is preferably 1% by mass to 10% by mass, more preferably 1% by mass to 5% by mass, and particularly preferably 3% by mass to 5% by mass.

The epoxidized polyamide resin, melamine formaldehyde resin, and urea resin for use in the present invention may be those typically used as paper strength agents. Examples of a commercial product of the epoxidized polyamide resin include WS series and CA series manufactured by SEIKO PMC CORPORATION, and EPA-SK01 manufactured by Yokkaichi Chemical Company, Limited. Examples of a commercial product of the melamine formaldehyde resin include BECKAMINE series manufactured by DIC Corporation, and MA series manufactured by SUNBAKE Co., Ltd. Examples of a commercial product of the urea resin include BECKAMINE series manufactured by DIC Corporation, and UA series manufactured by SUNBAKE Co., Ltd.

<Water-Soluble Organic Solvent>

As other solvents, water and a water-soluble organic solvent can be added to the treatment liquid.

Examples of the water-soluble organic solvent include polyhydric alcohol, polyhydric alcohol alkyl ether, polyhydric alcohol aryl ether, a nitrogen-containing heterocyclic compound, amide, amine, a sulfur-containing compound, propylene carbonate, and ethylene carbonate.

Examples of the polyhydric alcohol include glycerin, 1,3-butanediol, 3-methyl-1,3-butanediol, 1,5-pentanediol, 1,6-hexanediol, ethylene glycol, diethylene glycol, triethylene glycol, tetraethylene glycol, polyethylene glycol, propylene glycol, dipropylene glycol, tripropylene glycol, polypropylene glycol, hexylene glycol, trimethylol ethane, trimethylol propane, glycerol, 1,2,3-butanetriol, 1,2,4-butanetriol, 1,2,6-hexanetriol, and pentatriol.

Examples of the polyhydric alcohol alkyl ether include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ether include ethylene glycol monophenyl ether, and ethylene glycol monobenzyl ether.

Examples of the amine include monoethanol amine, diethanol amine, triethanol amine, monoethyl amine, diethyl amine, and triethyl amine.

Examples of the sulfur-containing compound include dimethyl sulfoxide, sulfolane, and thiodiethanol.

Among these water-soluble organic solvents, particularly preferred are glycerin, diethylene glycol, 1,3-butanediol, and 3-methyl-1,3-butanediol. These organic solvents exhibit excellent effects on solubility, and prevention of jet failures caused by moisture evaporation. Moreover, use of any of these organic solvents can realize a production of a treatment liquid having excellent storage stability and ejection stability.

An amount of the water-soluble organic solvent in the treatment liquid is preferably 1% by mass to 30% by mass, more preferably 5% by mass to 20% by mass.

<Surfactant>

A surfactant is not an essential component for the treatment liquid of the present invention, but a surfactant and a below-described defoaming agent may be added to the treatment liquid, for example, when the treatment liquid is used for a recording medium having a relatively low absorption, such as coated paper, as a level of the absorption of the liquid changes depending the surface texture of the recording medium.

The surfactant in the treatment liquid is added for the purpose of reducing surface tension of the treatment liquid. Some of the properties required for the treatment liquid of the present invention include an appropriate wettability to various recording media, and ejectability without unevenness. By providing appropriate wettability to the treatment liquid, the permeation speed to various recording media can be increased, and problems, such as abrasion and bleeding, can be solved. In order to improve the wettability, it is typical to add a surfactant to reduce the surface tension. Among surfactants, a surfactant containing a fluoroalkyl group is particularly preferable, because it has an ability to significantly reduce the surface tension, when the surfactant is water-soluble. Specifically, the surfactant for use is preferably the compound represented by the following structural formula 3, or polyoxyalkylene alkyl ether, or both.

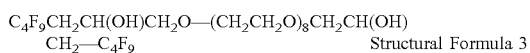

Structural Formula 3

Note that, the compound represented by the structural formula 3 does not contain PFOS (perfluorooctane sulfonate) and PFOA (perfluorooctanoic acid), and use of such a compound is excellent, as there is no concern regarding possible environmental pollution.

An amount of the surfactant in the treatment liquid is preferably 0.01% by mass to 4% by mass, more preferably 0.1% by mass to 1% by mass. When the amount of the surfactant is 0.01% by mass or greater, the effect obtainable by adding the surfactant can be sufficiently exhibited. When the amount of the surfactant is 4% by mass or less, the permeation of the treatment liquid to a recording medium is appropriately secured, and a problem, such as strike-through, which is caused by excessive permeation, can be solved.

<Defoaming Agent>

However, the surfactant containing the compound represented by the structural formula 3 has high surface activation ability. Even if the aforementioned surfactant is used in combination with a typically used silicone-based defoaming agent, once bubbles are generated, the bubbles remain without being disappeared. As a result of this, ejection failures may occur when the treatment liquid is ejected from an ejection head. When the surfactant is used in the present invention, therefore, it is preferably to also add a defoaming agent. Note that, it is preferred that at least one selected from the group consisting of N-octyl-2-pyrrolidone, 2,4,7,9-tetramethyldecane-4,7-diol, and 2,5,8,11-tetramethyldodecane-5,8-diol be used as the defoaming agent. By using one of the aforementioned defoaming agents and the surfactant represented by the structural formula 3 in combination, generation of bubbles is prevented, and a problem caused by the bubbles can be solved.

The surface tension of the treatment liquid of the present invention is determined with a ratio between the surfactant and the defoaming agent. In the case where the surface tension of the treatment liquid needs to be reduced depending on a type of a recording medium for use, a ratio of the surfactant is increased. Naturally, a problem associated with foaming is caused as the ratio of the surfactant is increased. Therefore, the ratio of the surfactant is preferably 40% by mass or less, more preferably 30% by mass or less, relative to a total amount of the surfactant and the defoaming agent.

<pH Regulator>

The pH of the treatment liquid is preferably 7 to 11. Since the pH of the treatment liquid is 7 to 11, corrosion of a member, such as a treatment liquid applying unit, can be prevented.

Examples of the pH regulator include alcohol amine, alkali metal hydroxide, ammonium hydroxide, phosphonium hydroxide, and alkali metal carbonate.

Examples of the alcohol amine include diethanol amine, triethanol amine, and 2-amino-2-ethyl-1,3-propanediol.

Examples of the alkali metal hydroxide include lithium hydroxide, sodium hydroxide, and potassium hydroxide.

Examples of the ammonium hydroxide include ammonium hydroxide, and quaternary ammonium hydroxide. Examples of the phosphonium hydroxide include quaternary phosphonium hydroxide.

<Water>

Examples of the water include pure water, or ultra-pure water, such as ion-exchanged water, ultrafiltration water, Milli-Q water, and distilled water.

An amount of the water for use in the present invention in the treatment liquid is preferably 60% by mass or less, more preferably 30% by mass to 60% by mass. When the amount of the water is in the range of 30% by mass to 60% by mass, an increase in the viscosity of the treatment liquid caused by evaporation of the water, gelation, and precipitation of the insoluble matter can be prevented.

<Aqueous Recording Ink>

A typical aqueous recording ink is composed of a colorant, a water-soluble organic solvent, a resin, a surfactant, a defoaming agent, water, etc. The aqueous recording ink for use in the present invention is an aqueous recording ink containing at least a colorant, a water-soluble organic solvent, a surfactant, and water, where the colorant is preferably dispersed in a carboxyl group-containing resin, or microcapsulated with a carboxyl group-containing resin.

Before or after ejecting the aqueous recording ink, the treatment liquid is applied onto a recording medium for the purpose of aggregating the colorant in the aqueous recording ink. The treatment liquid is preferably applied onto the recording medium before ejecting the aqueous recording ink to the recording medium.

Moreover, the recording medium is appropriately selected depending on the intended purpose without any limitation. For example, plain paper, gloss paper, special paper, cloth, a film, an OHP sheet, or general-purpose printing paper can be suitably used as the recording medium.

(Colorant)

As for the colorant, any of conventional dyes or pigments used in aqueous recording inks can be used. Moreover, colorant particles, in each of which an inorganic particle is covered with an organic pigment or carbon black, may be used as the colorant.

Examples of a method for covering the inorganic particles with carbon black include: liquid drying using coagulation or precipitation; and dry mixing where mechanical force is applied with mixing. Moreover, examples of a method for covering the inorganic particles with an organic pigment include: a method in which the organic pigment is precipitated in the presence of the inorganic particles; and a method in which the inorganic particles and the organic pigment are mechanically mixed and ground. For example, in the case where the inorganic particles are covered with an organic pigment having excellent thermal stability, chemical deposition may be used. Moreover, an organosilane compound layer formed of polysiloxane or alkyl silane may be optionally provided between the inorganic particle and the organic pigment. Use of the organosilane compound layer can improve adhesion between the inorganic particle and the organic pigment.

Examples of the inorganic particles include titanium dioxide, silica, alumina, iron oxide, iron hydroxide, and tin oxide. As for shapes of the inorganic particles, those having a small aspect ratio are preferable, spherical shapes are more preferable. In the case where a color colorant is adsorbed on surfaces of the inorganic particles, moreover, the inorganic particles are preferably colorless transparent or white. In the case where a black colorant is adsorbed, black inorganic particles may be used.

The primary particle diameter of the inorganic particles is preferably 100 nm or smaller, more preferably 5 nm to 50 nm.

As for the organic pigment covering the inorganic particles, examples of the black pigment thereof include carbon black, and aniline black. Examples of the color pigment thereof include anthraquinone, phthalocyanine blue, phthalocyanine green, diazo, monoazo, pyranthrone, perylene, heterocyclic yellow, quinacridone, and (thio)indigoid.

Among them, a phthalocyanine-based pigment, a quinacridone-based pigment, a monoazo yellow-based pigment, a disazo yellow-based pigment, and a heterocyclic yellow pigment are preferable in view of coloring ability.

Examples of the phthalocyanine-based pigment include copper phthalocyanine blue and derivatives thereof (C.I. Pigment Blue 15:3, C.I. Pigment Blue 15:4), and aluminum phthalocyanine Examples of the quinacridone-based pigment include C.I. Pigment Orange 48, C.I. Pigment Orange 49, C.I. Pigment Red 122, C.I. Pigment Red 192, C.I. Pigment Red 202, C.I. Pigment Red 206, C.I. Pigment Red 207, C.I. Pigment Red 209, C.I. Pigment Violet 19, and C.I. Pigment Violet 42.

Examples of the monoazo yellow-based pigment include C.I. Pigment Yellow 74, C.I. Pigment Yellow 109, C.I. Pigment Yellow 128, and C.I. Pigment Yellow 151.

Examples of the diazo yellow-based pigment include C.I. Pigment Yellow 14, C.I. Pigment Yellow 16, and C.I. Pigment Yellow 17.

Examples of the heterocyclic yellow pigment include C.I. Pigment Yellow 117, and C.I. Pigment Yellow 138.

A mass ratio (inorganic particle:colorant) of the inorganic particles to the colorant, which is an organic pigment or carbon black, is preferably 3:1 to 1:3, more preferably 3:2 to 1:2. When the mass ratio is within the aforementioned range, reduction in coloring ability and tinting ability, or reduction in transparency and color tone can be inhibited.

Examples of a commercial product of the colorant particles, in each of which an inorganic particle is covered with an organic pigment or carbon black, include a silica/carbon black composite material, a silica/phthalocyanine C.I. PIGMENT BLUE 153 composite material, a silica/disazo yellow composite material, and a silica/quinacridon C.I. PIGMENT RED 122 composite material (all manufactured by TODA KOGYO CORPORATION). These can be suitably used as primary particle diameters thereof are small.

In the case where inorganic particles having the primary particle diameter of 20 nm are covered with an equal amount of an organic pigment, the primary diameter of resulting colorant particles is about 25 nm. If such colorant particles can be dispersed in the state of primary particles using an appropriate dispersant, a very fine pigment dispersed ink having a dispersed particle diameter of 25 nm can be produced.

The primary particle diameter of the colorant particles in the aqueous recording ink is preferably 5 nm to 100 nm, more preferably 30 nm to 80 nm. When the primary particle diameter thereof is 5 nm or greater, thickening caused by a long term storage of an ink can be prevented, and aggregation of colorant particles can be prevented. When the primary particle diameter thereof is 100 nm or less, reduction in chroma and brightness of a printed part when an ink is printed on a recording medium, such as paper, and a film, can be prevented. Note that, the primary particle diameter of the colorant particles means the minimum unit of the colorant particles which cannot be made any finer by mechanical shearing.

An amount of the colorant particles in the aqueous recording ink is preferably 1% by mass to 20% by mass, more preferably 2% by mass to 15% by mass.

(Water-Soluble Organic Solvent)

In the aqueous recording ink for use in the present invention, water is used as a solvent. However, a water-soluble organic solvent is also used for the purpose of preventing the ink from being dried, and improving dispersion stability. Several water-soluble organic solvents may be used as a mixture.

Examples of the water-soluble organic solvent include polyhydric alcohol, polyhydric alcohol alkyl ether, polyhydric alcohol aryl ether, a nitrogen-containing heterocyclic compound, amide, amine, a sulfur-containing compound, propylene carbonate, and ethylene carbonate.

Examples of the polyhydric alcohol include glycerin, 1,3-butanediol, 3-methyl-1,3-butanediol, 1,5-pentanediol, 1,6-hexanediol, ethylene glycol, diethylene glycol, triethylene glycol, tetraethylene glycol, polyethylene glycol, propylene glycol, dipropylene glycol, tripropylene glycol, polypropylene glycol, hexylene glycol, trimethylol ethane, trimethylol propane, glycerol, 1,2,3-butanetriol, 1,2,4-butanetriol, 1,2,6-hexanetriol, and pentatriol.

Examples of the polyhydric alcohol alkylether include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ether include ethylene glycol monophenyl ether, and ethylene glycol monobenzyl ether.

Examples of the nitrogen-containing heterocyclic compound include 2-pyrrolidone, N-methyl-2-pyrrolidone, N-hydroxyethyl-2-pyrrolidone, 1,3-dimethylimidazolidinone, ε-caprolactam, and γ-butyrolactone.

Examples of the amide include acetoamide, dimethyl formamide, and diethyl acetoamide.

Examples of the amine include monoethanol amine, diethanol amine, triethanol amine, monoethyl amine, diethyl amine, and triethyl amine.

Examples of the sulfur-containing compound include dimethyl sulfoxide, sulfolane, and thiodiethanol.

Among these water-soluble organic solvents, particularly preferred are glycerin, diethylene glycol, 1,3-butanediol, and 3-methyl-1,3-butanediol. These organic solvents exhibit excellent solubility, and an excellent effect of preventing jetting failures, which may be caused by evaporation of moisture. Moreover, use of any of these organic solvents can realize a production of a treatment liquid having excellent storage stability and ejection stability.

A blending ratio of the colorant particles and the water-soluble organic solvent gives a large influence on ejection stability of the ink. When the blending amount of the solids of the pigment is large but the blending amount of the water-soluble organic solvent is small, evaporation of the moisture adjacent the nozzle is accelerated, to thereby cause ejection failures.

In the aqueous recording ink for use in the present invention, in addition to the water-soluble organic solvent, other components, such as saccharides or derivatives thereof, may be used in combination, as necessary. The saccharides are used for improving drying resistance, and examples thereof include monosaccharides, dissacharides, oligosaccharides (including trisaccharides, and tetrasaccharides), polysaccharides, and derivatives thereof. Specific examples thereof include glucose, mannose, fructose, ribose, xylose, trehalose, and maltotriose. In the present specification, polysaccharides mean sugar in the broad sense, and are used to refer to materials widely present in the nature, such as α-cyclodextrin, and cellulose.

Examples of derivatives of these saccharides include reducing sugar of the aforementioned saccharides, and oxidizing sugar. Among them, sugar alcohol is preferable. Examples thereof include maltitol, and sorbit.

An amount of the saccharide is preferably 0.1% by mass to 40% by mass, more preferably 0.5% by mass to 30% by mass, relative to the aqueous recording ink.

(Surfactant)

The surfactant is not particularly limited, and may be appropriately selected from surfactants that do not impair dispersion stability, depending on a colorant for use, or a combination with a water-soluble organic solvent, or a penetrating agent. Particularly in the case where the aqueous recording ink is printed on a recording medium, the surfactant for use is preferably a fluorosurfactant or silicone-based surfactant, which has low surface tension and a high leveling effect. The fluorosurfactant is particularly preferable.

As for the fluorosurfactant, for example, particularly preferred are a perfluoroalkyl sulfonic acid compound, a perfluoroalkyl carboxylic acid compound, a perfluoroalkyl phosphoric acid ester compound, a perfluoroalkyl ethylene oxide adduct, and a polyoxyalkylene ether polymer compound having a perfluoroalkyl ether group at a side chain thereof, as these surfactants have low foamability.

Examples of the perfluoroalkyl sulfonic acid compound include perfluoroalkyl sulfonic acid, and perfluoroalkyl sulfonic acid salt.

Examples of the perfluoroalkyl carboxylic acid compound include perfluoroalkyl carboxylic acid, and perfluoroalkyl carboxylic acid salt.

Examples of the perfluoroalkyl phosphoric acid ester compound include perfluoroalkyl phosphonic acid ester, and a salt of perfluoroalkyl phosphonic acid ester.

Examples of the polyoxyalkylene ether polymer compound having a perfluoroalkyl ether group at a side chain thereof include sulfate of a polyoxyalkylene ether polymer having a perfluoroalkyl ether group at a side chain thereof, and a salt of a polyoxyalkylene ether polymer having a perfluoroalkyl ether group at a side chain thereof.

Examples of a counter ion of the salt in the aforementioned fluorosurfactant include Li, Na, K, $NH_4$, $NH_3CH_2CH_2OH$, $NH_2(CH_2CH_2OH)_2$, and $NH(CH_2CH_2OH)_3$.

The fluorosurfactant is not particularly limited, and may be appropriately synthesized for use, or selected from commercial products. Examples of the commercial product thereof include: SURFLON series (S-111, S-112, S-113, S-121, S-131, S-132, S-141, S-145) manufactured by Asahi Glass Co., Ltd.; FLOURAD series (FC-93, FC-95, FC-98, FC-129, FC-135, FC-170C, FC-430, FC-431) manufactured by Sumitomo 3M limited; MEGAFACE series (F-470, F-1405, F-474) manufactured by DIC Corporation; Zonyl TBS, FSP, FSA, FSN-100, FSN, FSO-100, FSO, FS-300, UR, all manufactured by Du Pont Kabushiki Kaisha; FT-110, FT-250, FT-252, FT-400S, FT-150, FT-400SW, all manufactured by NEOS COMPANY LIMITED; PF-151N manufactured by Omnova Solutions, Inc.; and UNIDYNE DSN403N manufactured by DAIKIN INDUSTRIES, LTD. Among them, the fluorosurfactant represented by the following general formula A is particularly preferable.

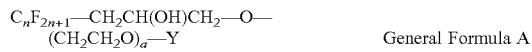

General Formula A

In the general formula A, n is an integer of 2 to 6, a is an integer of 4 to 50, and Y is $—C_bH_{2b+1}$ (b is an integer of 2 to 19), or $—CH_2CH(OH)CH_2—C_mF_{2m+1}$ (m is an integer of 2 to 6).

Examples of the aforementioned compound include those having the following structures.

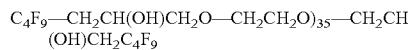

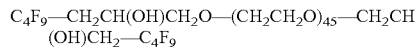

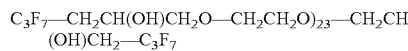

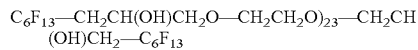

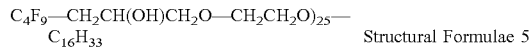

Structural Formulae 5

As for the aforementioned compound, the surfactant having the following structure is particularly preferable.

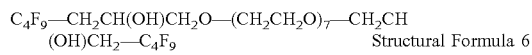

Structural Formula 6

Note that, the fluorosurfactant represented by the structural formula above does not contain PFOS (perfluorooctane sulfonate) and PFOA (perfluorooctanoic acid), and use of such fluorosurfactant is excellent, as there is no concern regarding possible environmental pollution.

The silicone-based surfactant is appropriately selected depending on the intended purpose without any limitation. Among them, the silicone-based surfactant that is not decomposed at high pH is preferable. Examples thereof include side chain-modified polydimethylsiloxane, both terminal-modified polydimethylsiloxane, one terminal-modified polydimethylsiloxane, and side chain both terminal-modified polydimethylsiloxane. Among them, those having a polyoxyethylene group or a polyoxyethylene polyoxypropylene group as a modified group are particularly preferable, because they exhibit excellent characteristics as an aqueous surfactant.

The silicone-based surfactant may be appropriately synthesized for use, or selected from commercial products. The commercial products thereof are readily available from BYK Japan K.K., Shin-Etsu Chemical Co., Ltd., and Dow Corning Toray Co., Ltd.

As for the silicone-based surfactant, moreover, a polyether-modified silicone-based surfactant can be used. Examples thereof include a compound, in which a polyalkylene oxide structure is introduced to a side chain of the Si site of dimethylsiloxane.

The polyether-modified silicone compound may be appropriately synthesized for use or selected from commercial products. Examples of the commercial product thereof include KF-618, KF-642, and KF-643, manufactured by Shin-Etsu Chemical Co., Ltd.

Other than the fluorosurfactant and the silicone-based surfactant, an anionic surfactant, a nonionic surfactant, or an amphoteric surfactant so can be used.

Examples of the anionic surfactant include an acetic acid salt of polyoxyethylene alkyl ether, dodecylbenzene sulfonic acid salt, succinic acid ester sulfonic acid salt, lauric acid salt, and polyoxyethylene alkyl ether sulfate salt.

Examples of the nonionic surfactant include an acetylene glycol-based surfactant, polyoxyethylene alkyl ether, polyoxyethylene alkyl phenyl ether, polyoxyethylene alkyl ester, and polyoxyethylene sorbitan fatty acid ester.

Examples of the acetylene glycol-based surfactant include 2,4,7,9-tetramethyl-5-decine-4,7-diol, 3,6-dimethyl-4-octine-3,6-diol, and 3,5-dimethyl-1-hexine-3-ol. Examples of a commercial product of the acetylene glycol-based surfactant include SURFYNOL series (104, 82, 465, 485, TG) manufactured by Air Products and Chemicals, Inc.

Examples of the amphoteric surfactant include lauryl aminopropionic acid salt, lauryl dimethyl betaine, stearyl dimethyl betaine, lauryl dihydroxyethyl betaine, lauryl dimethyl amine oxide, myristyl dimethyl amine oxide, stearyl dimethyl amine oxide, dihydroethyl lauryl amine oxide, polyoxyethylene coconut oil alkyldimethyl amine oxide, dimethylalkyl(coconut oil) betaine, and dimethyl lauryl betaine. Moreover, the commercial products thereof are readily available from Nikko Chemicals Co., Ltd., Nihon Emulsion Co., Ltd., Nippon Shokubai Co., Ltd., TOHO Chemical Industry Co., Ltd., Kao Corporation, ADEKA CORPORATION, Lion Corporation, AOKI OIL INDUSTRIAL CO., LTD., and Sanyo Chemical Industries, Ltd.

The aforementioned various surfactants may be used alone, or in combination. Even in the case where the surfactant per se is hardly dissolved in the aqueous recording ink, the surfactant is dissolved by mixing a plurality of the surfactants, so that the surfactants can be stably present.

An amount of the surfactant in the aqueous recording ink is preferably 0.01% by mass to 4% by mass, more preferably 0.1% by mass to 1% by mass. When the amount of the surfactant is 0.01% by mass or greater, an effect obtainable by adding the surfactant can be sufficiently exhibited. When the amount of the surfactant is 4% by mass or less, permeation of the aqueous recording ink to a recording medium is appropriately maintained, and a problem, such as a strike-through, which is caused by excessive permeation of the ink, can be prevented.

(Defoaming Agent)

However, particularly the fluorosurfactant has extremely high surface activation ability. Even when a commonly used silicone-based defoaming agent added together with the fluorosurfactant, generated bubbles are remained without defoaming. Therefore, ejection failures may occur when the ink is ejected. In the present invention, it is preferred that a defoaming agent be added to present generation of bubbles. As for the defoaming agent, at least one selected from the group consisting of N-octyl-2-pyrrolidone, 2,4,7,9-tetramethyldecane-4,7-diol, and 2,5,8,11-tetramethyldodecane-5,8-diol is preferably used. By using at least one of the aforementioned defoaming agents and the aforementioned fluorosurfactant in combination, generation of bubbles can be prevented, and problems caused by the bubbles can be prevented.

A surface tension of the aqueous recording ink for use in the present invention is determined with a ratio between the fluorosurfactant and the defoaming agent. When it is necessary to reduce the surface tension of the aqueous recording ink because of a recording medium for use, a ratio of the fluorosurfactant is increased. Naturally, a problem of foaming is caused, as a ratio of the fluorosurfactant is increased. Therefore, the ratio of the fluorosurfactant is preferably 40% by mass or less, and more preferably 30% by mass or less, relative to a total amount of the fluorosurfactant and the defoaming agent.

(Carboxyl Group-Containing Resin)

The aqueous recording ink for use in the present invention preferably contains the colorant, which is dispersed in a carboxyl group-containing resin, or is encapsulated as microcapsules with a carboxyl group-containing resin, and preferably contains a the carboxyl group-containing resin. As a result of this, organic acid or a cationic polymer in the treatment liquid reacts with the carboxyl group-containing resin in the aqueous recording ink, to aggregate the pigment on a recording medium. Therefore, a high quality image is realized. Even in the case where no treatment liquid is present, an effect, such as an improvement of abrasion resistance can be expected, as the carboxyl group-containing resin is contained in the aqueous recording ink.

Examples of the carboxyl group-containing resin include a styrene-acrylic resin, a maleic acid resin, a styrene-maleic acid resin, a rosin-modified maleic acid resin, an alkyd resin, and a modified alkyd resin. Examples of the commercial product thereof include: MALKYD series manufactured by Arakawa Chemical Industries, Ltd.; and HARIMACK series, and HARIPHTHAL series manufactured by Harima Chemicals Group, Inc. For example, the carboxyl group-containing resin is produced by the synthesis examples described below.

As for an embodiment for adding the carboxyl group-containing resin, the carboxyl group-containing resin may be added in the state where a pigment serving as the colorant is encapsulated (microcapsulated) with the carboxyl group-containing resin, or the carboxyl group-containing resin may be added in the state where the colorant is dispersed in the carboxyl group-containing resin. As for a method for encapsulating the pigment with the carboxyl group-containing resin to form microcapsules, a typical conventional method, such as phase-transfer emulsification, and acid deposition, can be used. Preferred is a method, in which after dispersing the colorant in the carboxyl group-containing resin, the resulting dispersion is added to the ink, or a method, in which after encapsulating the colorant with the carboxyl group-containing resin to form microcapsules, the microcapsules are added to the ink.

(Other Components)

Other than the aforementioned components, a conventional penetrating agent, polymer particles, pH regulator, and an antiseptic antimold agent, can be added to the aqueous recording ink for use in the present invention, as necessary.

A for the penetrating agent, a C8-C11 polyol compound or a glycol ether compound is preferably used. These compounds have an effect of accelerating a permeation speed of the ink to a recording medium, as well as preventing bleeding, and are partially water-soluble compounds having a solubility of 0.1% by mass to 4.5% by mass to water of 25° C. Examples of the C8-C11 polyol compound include 2-ethyl-1,3-hexanediol, 2,2,4-trimethyl-1,3-pentanediol, and 1,2-octanediol.

Examples of the glycol ether compound include a polyhydric alcohol alkyl ether compound, and a polyhydric alcohol aryl ether compound.

Examples of the polyhydric alcohol alkyl ether compound include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ether compound include ethylene glycol monophenyl ether, and ethylene glycol monobenzyl ether.

These penetrating agents have higher boiling points than that of water, and are liquids at 25° C. An amount of the penetrating agent contained in the aqueous recording ink is preferably 0.1% by mass to 10% by mass, and more preferably 0.5% by mass to 5% by mass.

As for the polymer particles, those having a film forming ability are used. The film forming ability means a characteristic that, when polymer particles are dispersed in water to form an emulsion, a resin film is formed, as the moisture of the aqueous emulsion is evaporated.

When the aqueous recording ink contains the aforementioned polymer particles, the polymer particles form a film as a volatile component in the aqueous recording ink is evaporated. As a result, a colorant in the aqueous recording ink is strongly adhered onto a recording medium. Therefore, an image having excellent abrasion resistance and water resistance can be realized.

As the polymer particles form a film at room temperature, the polymer particles having the minimum film forming temperature of 30° C. or lower are preferable, and those having the minimum film forming temperature of 10° C. or lower are more preferable. Here, the minimum film forming temperature means the minimum temperature at which a clear continuous film is formed when a polymer emulsion obtained by dispersing the polymer particles in water is thinly flow casted on a metal plate, such as aluminum, and temperature is increased. Examples of the polymer particles include Landi PL series manufactured by MIYOSHI OIL & FAT CO., LTD.

The volume average particle diameter of the polymer particles is preferably 5 nm to 200 nm, more preferably 10 nm to 100 nm.

As for the polymer particles, those having a single-particle structure can be used. For example, an alkoxysilyl group is contained in an emulsion particle, the alokoxysilyl group is brought into moisture remained, as fusion of emulsion particles due to moisture evaporation in the process of forming a coating film, to thereby cause hydrolysis and form a silanol group. As a silanol group is remained, moreover, the alkoxysilyl group or silanol group are reacted to another to form a rigid crosslink structure formed of a siloxane bond. In the manner as described, when a reactive functional group is present in the polymer particle, a network structure can be formed during formation of a film by reacting the functional groups, without adding a curing agent.

Moreover, it is also possible to use polymer particles having a core-shell structure containing a core and a shell covering the core. Here, the core-shell structure means an embodiment where two or more polymers each having a different composition are present in a particle in the state of phase separation. Accordingly, the core-shell structure is not necessarily an embodiment in which a core is completely covered with a shell, but also includes an embodiment in which part of the core is covered with the shell. Moreover, the core-shell structure may include an embodiment where part of the polymer of the shell forms domains in the core particle, and an embodiment having a multi-layer structure formed of three or more layers, in which one or more layers having a different composition is provided between the core and the shell.

The polymer particles can be obtained by a conventional method, such as by emulsifying and polymerizing a unsaturated vinyl monomer (unsaturated vinyl polymer) in water in the presence of a polymerization catalyst, and a emulsifying agent. An amount of the polymer particles in the aqueous recording ink is preferably 0.5% by mass to 20% by mass, more preferably 1% by mass to 5% by mass.

The aforementioned colorant particles (composite pigment particles), in each of which the inorganic particle is covered with the organic pigment or carbon black tends to exhibit acidity when the colorant particles are kneaded and dispersed in water together with an anionic dispersing agent. A surface of the composite pigment particle dispersed in a medium, such as water, is surrounded with the anionic dispersing agent, and therefore it is negatively charged. However, the ink exhibits acidity as a whole. Therefore, the inner part of the composite pigment particle is positively charged, and the negative charge of the surface of the particle tends to be neutralized. In this state, the dispersed particles are aggregated to cause ejection failures. Therefore, the dispersed state is preferably stabilized by adding a pH regulator and maintaining the alkaline state, so that the ejection performance is stabilized.

The pH of the aqueous recording ink is preferably 9 to 11. As the pH of the aqueous recording ink is 9 to 11, corrosion of a member, such as an aqueous recording ink applying unit, can be prevented.

The pH regulator is preferably added to a kneaded dispersion liquid together with additives, such as a wetting agent, and a penetrating agent, rather than adding when a pigment is kneaded and dispersed in water together with a dispersing agent. This is because a dispersion state may be disturbed by adding the pH regulator depending on a type of the pH regulator.

Examples of the pH regulator include alcohol amine, alkali metal hydroxide, ammonium hydroxide, phosphonium hydroxide, and alkali metal carbonate.

Examples of the alcohol amine include diethanol amine, triethanol amine, and 2-amino-2-ethyl-1,3-propanediol.

Examples of the alkali metal hydroxide include lithium hydroxide, sodium hydroxide, and potassium hydroxide.

Examples of the ammonium hydroxide include ammonium hydroxide, and quaternary ammonium hydroxide.

Examples of the phosphonium hydroxide include quaternary phosphonium hydroxide.

Examples of the alkali metal carbonate include lithium carbonate, sodium carbonate, and potassium carbonate.

Examples of the antiseptic/antifungal agent include sodium dehydroacetate, sodium sorbate, sodium-2-pyridinethiol-1-oxide, sodium benzoate, and sodium pentachlorophenol.

Examples of the anti-rust agent include acidic sulfite salt, sodium thiosulfate, ammonium thiodiglycolate, diisopropyl ammonium nitrite, pentaerythritol tetranitrate, and dicyclohexyl ammonium nitrite <Ink Cartridge>

The treatment liquid of the present invention may be used together with the aqueous recording ink, as an ink set for inkjet recording device.

A cartridge charged with the treatment liquid of the present invention or the aqueous recording ink is a cartridge in which the treatment liquid or the aqueous recording ink is housed in a container, and may further contain appropriately selected other members, as necessary.

The container is not particularly limited, and a shape, structure, size, and material thereof can be appropriately selected depending on the intended purpose. Examples of the container include a plastic container, and an ink bag formed of an aluminum laminate film.

Specific examples thereof include the one having the structure illustrated in FIGS. 5 and 6 described below.

<Inkjet Recording Device>

The inkjet recording device for use in the present invention contains an image forming unit configured to jet the ink to a surface of a recording medium, a retaining unit configured to retain a treatment liquid, and a treatment unit configured to carry out a treatment on the surface of the recording medium before or after the image formation performed by the image forming unit.

Moreover, the image forming unit contains at least an ink jet unit, and may contain other units, such as a stimuli generating unit, and a controlling unit, as necessary.

The inkjet recording method of the present invention contains applying the treatment liquid of the present invention to a surface of a recording medium, on which recording is performed, to treat the recording medium, and applying an aqueous recording ink on the treated recording medium to form an image.

FIG. 1 is a schematic diagram (side explanatory view) illustrating one example of the inkjet recording device for use in the present invention.

The inkjet recording device 101 is equipped with head units 110K, 110C, 110M, 110Y in each of which heads for ejecting an aqueous recording ink are collectively provided, maintenance units 111K, 111C, 111M, 111Y each corresponding to each head unit to perform a maintenance of heads, ink cartridges 107K, 107C, 107M, 107Y for supplying an ink, and sub ink-tanks 108K, 108C, 108M, 108Y for storing part of the ink supplied from the cartridge and supplying the ink to the head at an appropriate pressure.

The inkjet recording device 101 further contains: a paper ejection system composed of a convey belt 113 for suctioning a recording medium 114 by a suction fan 120 and conveying the recording medium 114 by adsorbing on the convey belt 113, conveying rollers 119, 121 for supporting the convey belt 113, a tension roller 115 for controlling the convey belt 114 to have an appropriate tension, a platen 124 and a platen roller 118 for giving an appropriate flatness to the convey belt 113, a charging roller 116 for giving static charges so that the recording medium 114 is adsorbed on the conveying belt 113, a paper ejection roller 117 for pressing the recording medium 114 down, and a paper ejection tray 104 for stocking the ejected recording medium 114; and a paper feeding system composed of a paper feeding tray 103 for storing recording media 114 to be printed, separation pads 112 and 122 for sending the recording media 114 one by one from the feeding tray 103, a counter roller 123 for securely adhering the sent recording medium 114 to a charging belt, and a manual feeding tray 105 used in the case where paper is fed manually.

Moreover, the inkjet recording device 101 is equipped with a waste liquid tank 109 for collecting the waste liquid discharged after the maintenance, and a control panel 106 for controlling the device and displaying the state of the device.

A nozzle array of each head unit is aligned so as to be orthogonal to the conveyance direction of the recording medium 114, and is formed as to be longer than a length of a recording region. The recording media 114 in the paper feeding tray are separated into one piece by a separation roller, and the separated recording medium is fixed onto the convey belt by being pressed on the convey belt by a press roller. When the recording medium is passed under the heat unit, droplets of the ink are ejected from the heat unit to the recording medium at high speed to form a pattern on the recording medium. The recording medium is then separated from the convey belt by the separation claw, and is supported with the paper ejection roller and another paper ejection roller, to thereby discharge as recorded matter into the paper ejection tray.

In this device, a coating system is provided as a system for treating a surface of a recording medium with the treatment liquid, and the coating system uses roller coating. The treatment liquid 135 is supplied from the treatment liquid storage tank 140 through a channel (not illustrated), and is taken up to a surface of a roller by a pumping roller 137, and is then transferred onto a film thickness controlling roller 138. Subsequently, the treatment liquid transferred onto the coating roller 136 is transferred onto a recording medium 114 passing through a space between the coating roller 136 and the counter roller 139 for coating.

An amount of the treatment liquid transferred to the coating roller 136 is adjusted by controlling a nip thickness with the coating roller 136. When an application of the treatment liquid is not desired, the treatment liquid present on the surface of the coating roller 136 can be scraped off by pressing a movable blade 134 against the coating roller 136 so as not to leave the treatment liquid on the surface of the coating roller 136. In this manner, functional disorders caused by the residual treatment liquid on the coating roller 136 (e.g., thickening, adherence to the counter roller 139 for coating, and coating unevenness) can be prevented in advance. Alternatively, as illustrated in FIG. 1, another coating mechanism may be employed where feeding sections are provided at the upper side and the bottom side respectively. In this mechanism, the bottom feeding section is used when the treatment liquid is coated, and the upper feeding section is used when the treatment liquid is not coated.

Other than the aforementioned roller coating, it is possible to spray coating the treatment liquid using a jet system. For example, the treatment liquid is loaded in a head similar to 110K, the treatment liquid is ejected onto a recording medium 114 in the same manner as when the ink is ejected. In this manner, an amount of the treatment liquid ejected, and a position for ejection can be controlled easily, and highly precisely. Moreover, a roller coating system and a spray coating system may be used in combination.

Whichever system is used, the treatment liquid can be applied to a desired position in a desired amount.

An amount of the treatment liquid deposited is preferably 0.5 $g/m^2$ to 2 $g/m^2$ on dry basis. When the amount of the treatment liquid deposited is less than 0.5 $g/m^2$, the ability of the treatment liquid to aggregate the pigment is weak, beading may occur, and the resulting image density may be low. When the amount thereof is greater than 2 $g/m^2$, the ability of aggregating the pigment is too strong to deteriorate abrasion resistance.

Moreover, the image forming method preferably further contain drying the treatment liquid after the applying the treatment liquid onto the surface of the recording medium to be recorded. By heating the recording medium onto which the treatment liquid and the ink have been applied by a hot air fan 150, the drying is accelerated to thereby improve fixing ability. Note that, in the present embodiment, the heating is performed by the hot air fan after the printed recording medium, heating can be performed any time as long as it is after applying the treatment liquid on the recording medium. The heating may be performed before or before and after the printing. Moreover, the heating system is not necessarily the system using the hot air fan, and the heating may be performed with a unit, such as a heating roller. The heating is preferably performed at 30° C. to 80° C. for 5 seconds to 30 seconds.

Figure 3:
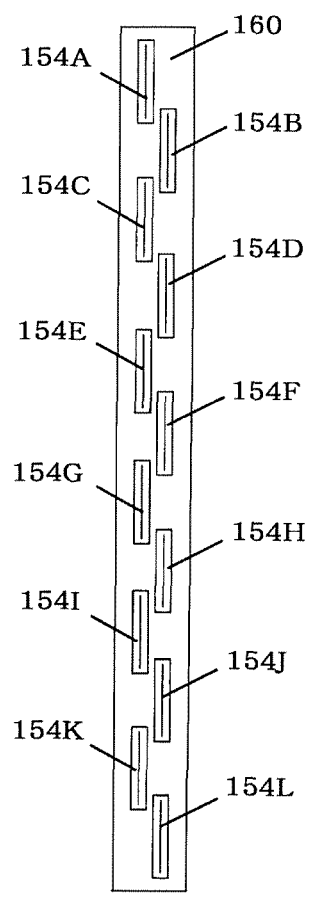
FIG. 3 is a schematic view illustrating one example of a head array in a heat unit of an inkjet recording device for use in the present invention.

FIG. 3 is a schematic diagram illustrating one example of a head alignment of the head unit in the inkjet recording device.

The head unit contains heads 154A to 154L fixed on a head circumferential member 160, and the heads are fixed in a staggered arrangement so that the heads overlap with part of a nozzle.

Figure 4:
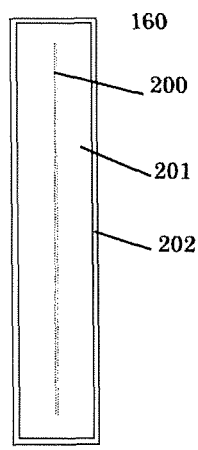
FIG. 4 is a schematic view illustrating one of the heads aligned in the heat unit of FIG. 3.

FIG. 4 is a schematic diagram illustrating a head aligned in the head unit of FIG. 3. Each head has a nozzle 200, which is composed of two arrays of openings provided in a nozzle plate 201 in a staggered arrangement. The head and the head circumferential member are sealed with a filler 202 to remove any space from the side surface of the nozzle.

Figure 2:
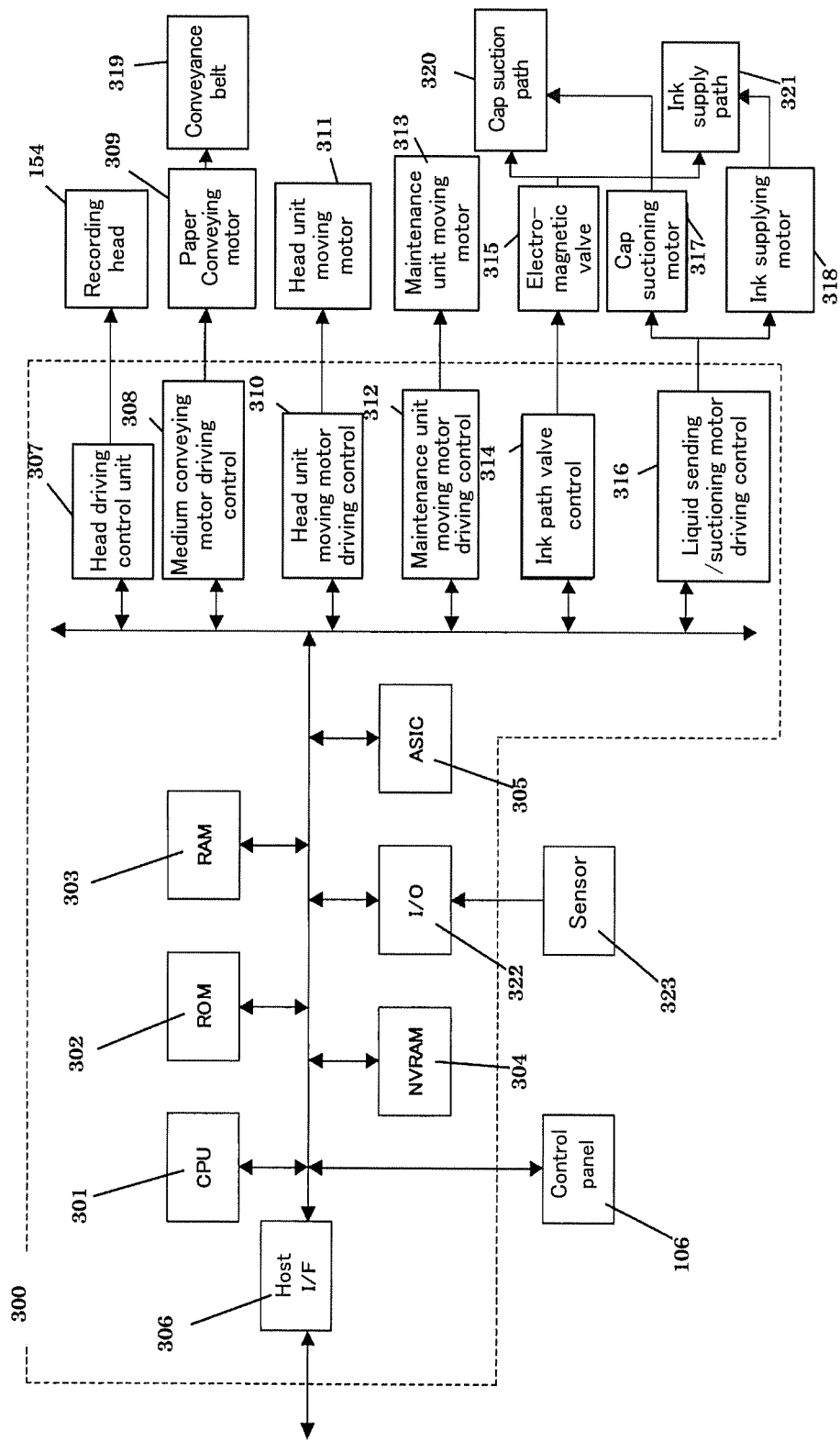
FIG. 2 is a schematic block diagram explaining a control unit in FIG. 1.

Next, the outline of the control unit of the inkjet recording device illustrated in FIG. 1 is explained with reference to FIG. 2. Note that, FIG. 2 is a schematic block explanatory diagram of the control unit.

The control unit 300 contains: CPU 301 for controlling the entire device; ROM 302 for storing programs CPU 301 executes (a value of a contamination degree of a nozzle surface relative to an ejection of the ink for use in the present invention, threshold for the contamination degree of the nozzle surface, and data for driving waves) and other fixed data; ROM 303 for temporarily storing image data; a non-volatile memory (NVRAM) 304 for keeping the data while a power source of the device is shut out; and ASIC 305 for processing various signals for the image data, and input and output signals for image processing for replacing positions of images, and other input and output signals for controlling the entire device.

Moreover, the control unit control unit 300 contains: a host I/F 307 for sending and receiving data and signals to and from a host; a head drive control unit 307 for generating a drive wave for driving and controlling a pressure generating unit of the recording head 154; a recording medium conveying motor driving unit 308 for driving a recording medium conveying motor 309; a head unit moving motor drive control unit 310 for driving a heat unit (carriage) moving motor 311; a maintaining unit moving motor drive control unit 312 for driving a maintaining unit moving motor 313; an ink channel valve control unit 314 for controlling opening and closing of an electromagnetic valve 315 of an ink channel; a feeding/suction motor driving unit 316 for controlling driving a cap suction motor 317 or an ink feeding motor 318; and I/O 322 for inputting detecting signals from an encoder which outputs a detecting signal corresponding to a traveling amount and speed of the conveyance belt 113, detecting signals from a sensor 323 for detecting temperature and humidity environment (or can be either of them), detecting signals on the ink level of each subtank, and detecting signals from various sensors not shown in the diagram. The control unit 300 is connected to a control panel 106 to or on which information necessary to the device is input or displayed.

The control unit 300 receives at the host I/F 306 printing data and the like from a host via a cable or net, and in this case the host is such as an information-processing device (e.g., a personal computer), an image scanning device (e.g., an image scanner), and an imaging device (e.g., a digital camera).

CPU 301 reads out printing data into a receiving buffer contained in the host I/F 306 and analyzes the data, optionally makes the data to image-processed or repositioned by ASIC 305, synchronizes the image data (i.e. dot pattern data) which equivalent of one page for a head width of the recording head 154 with respect to a clock signal, and output the signal to the head drive controlling unit 307.

Then, CPU 301 reads out printing data in the receiving buffer contained in the host I/F 306 and analyzes it. After carrying out necessary image processing or repositioning of the data by ASIC 305, the image data is output to the head drive controlling unit 307. Note that, the formation of the dot pattern data for image output may be stored as font data in, for example, ROM 302. Alternatively, the image data may be expanded to bit map data by a printer driver at the host side, and the bit map data may be output to the device.

The head drive controlling unit 307 selectively applies voltage to a pressure generating unit of the recording head 154 based on the image data (i.e., the dot pattern data) for one page of the recording head 154 input per page, and drives the recording head 154.

Although it is not shown in the diagram, in the case where the treatment liquid is coated by a roller, a control unit of a motor for application, a motor to be controlled, and a sensor for controlling are provided in the device, as it is necessary to control driving of a group of rollers for application, such as coating rollers.

Furthermore, in the case where the treatment liquid is applied by an inkjet method, there is a possibility to cause nozzle clogging due to mixing with other colors, unless the maintenance operation is performed in a different manner from that of the other inks. Therefore, it is desirable that a maintenance unit moving motor is provided for the treatment liquid, separately from that for the ink.

Next, an ink cartridge is explained with reference to FIGS. 5 and 6. FIG. 5 is a diagram illustrating one example of the ink cartridge for use in the present invention, and FIG. 6 is a diagram including a casing (exterior) of the ink cartridge of FIG. 5.

Figure 5:
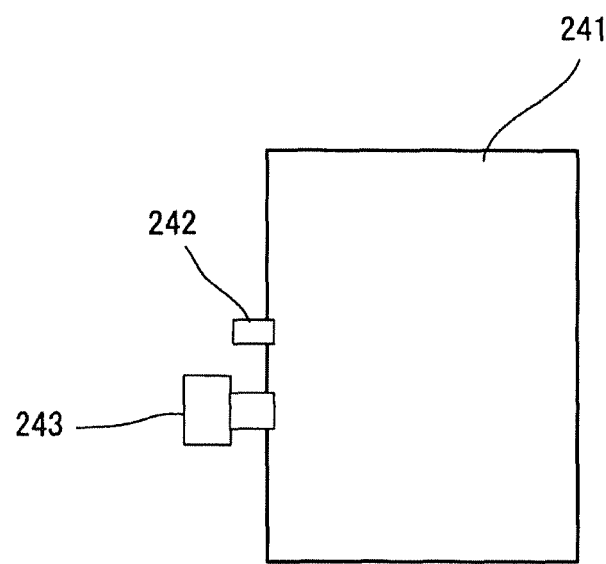
FIG. 5 is a diagram illustrating one example of an ink cartridge used in the inkjet recording device for use in the present invention.
Figure 6:
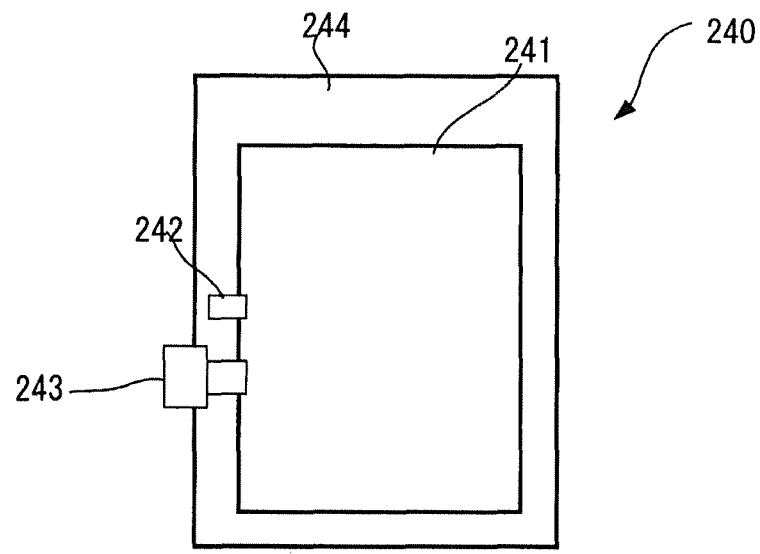
FIG. 6 is a diagram illustrating the ink cartridge of FIG. 5 including a casing (exterior housing).

As illustrated in FIG. 5, an ink bag 241 is filled with an aqueous recording ink from an ink inlet 242, and the ink inlet 242 is sealed by fusion bonding after releasing the air from the ink bag 241. At the time of use, a needle attached to the main body of the device is inserted into an ink outlet 243 formed of a rubber member to supply the ink to the device. The ink bag 241 is formed of a wrapping member, such as an air non-permeable aluminum laminate film. As illustrated in FIG. 6, the ink bag 241 is typically housed in a plastic cartridge case 244, which is then detachably mounted in use to various inkjet recording devices as the ink cartridge 240.

By charging the ink cartridge 240 with the treatment liquid instead of the ink and using the cartridge as a cartridge for a treatment liquid, such cartridge can be used by detachably mounting in various inkjet recording devices, similar to the ink cartridge.

Figure 7:
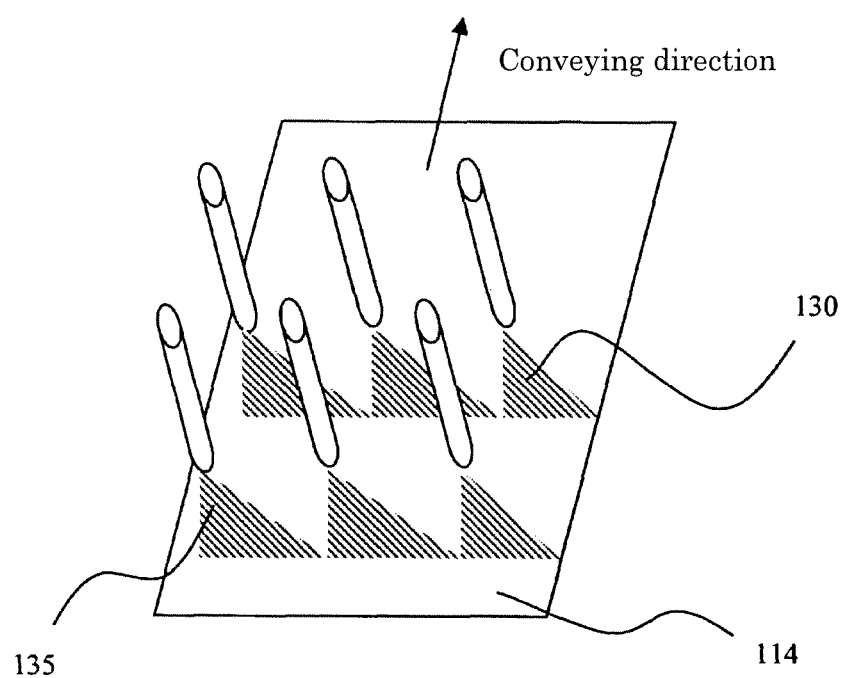
FIG. 7 is a schematic diagram illustrating one example of an ejection system from an ejection head in the inkjet recording device for use in the present invention.
Figure 8:
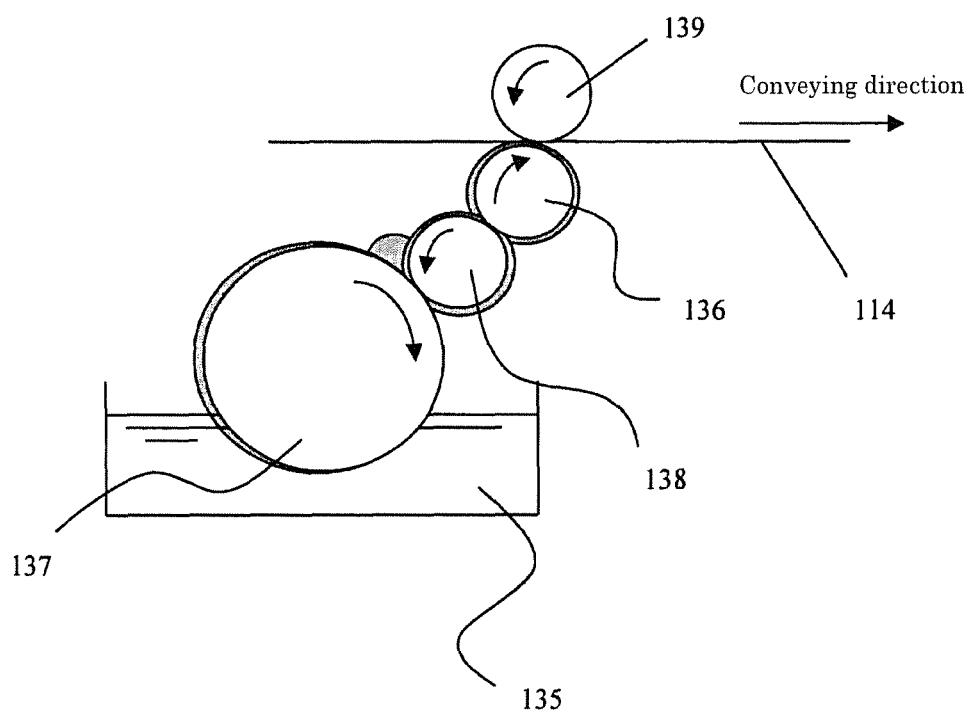
FIG. 8 is a schematic diagram illustrating one example of a coating system using three rollers.
Figure 9:
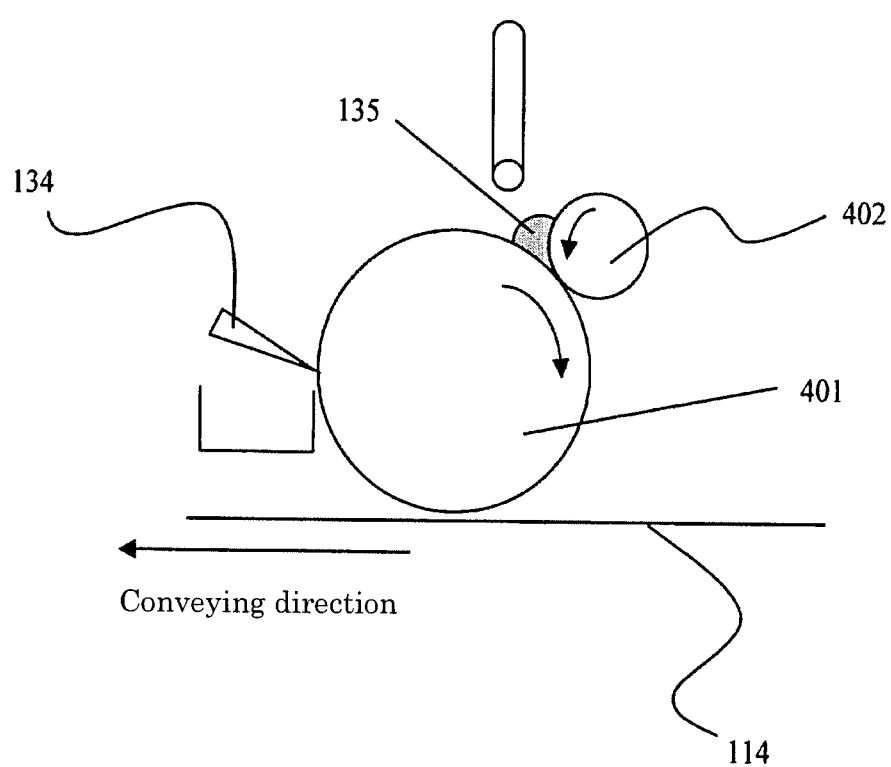
FIG. 9 is a schematic diagram illustrating one example of a coating system using two rollers.

As for the embodiment for applying a treatment liquid onto a recording medium, there are systems illustrated in FIGS. 7 to 9.

FIG. 7 depicts an ejection system from ejection heads. A recording head for ejecting the treatment liquid 135 is provided at the upper stream side of the conveying direction of the recording medium 114, and a recording head for the aqueous recording ink 130 is provided at downstream side of the conveying direction. As a result the treatment liquid 135 ejected in advance based on the predetermined image data can be mixed with the recording ink 130 on the recording medium 114.

FIG. 8 depicts a three-roller coating system, but the detailed explanations thereof are omitted, as they are disclosed in FIG. 1.

FIG. 9 depicts a two-roller coating system. The treatment liquid 135 ejected from an ejection head is applied on the recording medium 114 by controlling the thickness thereof to the predetermined thickness by the coating roller 401 and the film thickness controlling roller 402. Moreover, an excessive treatment liquid remained on the coating roller 401 is corrected by a mobile blade 134. Although it is not illustrated, an ejection head for an aqueous recording ink is provided at the downstream side of the conveying direction in FIG. 9.

EXAMPLES

The present invention is more specifically explained through Examples and Comparative Examples hereinafter, but Examples shall not be construed as to limit the scope of the present invention.

<Preparation of Aqueous Recording Ink>

Synthesis Example

A reaction vessel of an automatic polymerization reaction device (polymerization tester DSL-2AS, manufactured by Todoroki Sangyo Co., Ltd.) was charged with 550 g of methyl ethyl ketone, and then purged with a nitrogen gas with stirring. The automatic polymerization reaction device had the reaction vessel equipped with a reflux device containing a stirring device, a dripping device, a thermometer, and a reflux device having a nitrogen inlet device at the upper part thereof. After heating to 80° C. while maintaining the internal atmosphere of the reaction vessel to the nitrogen atmosphere, a mixed solution of 75.0 g of 2-hydroxyethyl methacrylate, 77.0 g of methacrylic acid, 80.0 g of styrene, 150.0 g of butyl methacrylate, 98.0 g of butyl acrylate, 20.0 g of methyl methacrylate, and 40.0 g of t-butylperoxy-2-ethylhexanate (PERBUTYL® 0, manufactured by NOF CORPORATION) was added dropwise by the dripping device over 4 hours. After the completion of dripping, the reaction mixture was further allowed to react at the same temperature for 15 hours, to thereby obtain a methyl ethyl ketone solution of an anionic group-containing styrene-acryl copolymer A having an acid value of 100 (measured by the method specified in JIS K 0070-1992), the weight average molecular weight of 21,000 (measured by means of D5280 LCS M-PDA manufactured by Shimadzu Corporation), and Tg of 31° C. (measured by means of STA7200 manufactured by Hitachi High-Tech Science Corporation). After the completion of the reaction, part of the methyl ethyl ketone was removed by vacuum distillation, to adjust the non-volatile component content thereof to 50%. In this manner, a copolymer A solution was obtained.

Preparation Example 1

A mixing chamber equipped with a cooling jacket was charged with 1,600 g of carbon black (Raven 1080, manufactured by Birla Carbon), 800 g of the copolymer A solution obtained in Synthesis Example, 143 g of a 10% sodium hydroxide aqueous solution, 100 g of methyl ethyl ketone, and 1,957 g of water, and the resulting mixture was stirred and mixed. The resulting mixture was passed through a disperser (SC Mill SC100, manufactured by Nippon Coke & Engineering Co., Ltd.) filled with zirconia beads having diameters of 0.3 mm to disperse the mixture in a circulation system (a system where the dispersion liquid from the disperser was returned to the mixing chamber) for 6 hours. During this operation, the rotation number of the disperser was set at 2,700 rpm, and cold water was passed through the cooling jacket so that the temperature of the dispersion liquid was kept at 40° C. or lower.

After the dispersion, the resulting dispersion liquid was taken out from the mixing chamber, followed by washing the mixing chamber and the flow path of the disperser with 10,000 g of water. This washing water wan then combined with the dispersion liquid to thereby obtain a diluted dispersion liquid. This diluted dispersion liquid was placed in a glass distillation device, and the entire volume of the methyl ethyl ketone, and part of the water were removed. After cooling the dispersion liquid to room temperature, 10% hydrochloric acid was added dropwise to adjust the pH to 4.5 with stirring. Thereafter, the solids were collected through filtration performed by a Nutsche filtration device, and the resultant was washed with water. The resulting cake was collected in a container, and 200 g of a 20% potassium hydroxide aqueous solution was added to the cake, followed by dispersing the mixture by a disperser (TK Homodisperser, manufactured by PRIMIX Corporation). To the resulting dispersion liquid, water was added to adjust the non-volatile component, to thereby obtain aqueous pigment dispersion elements containing the non-volatile component of 20% dispersed as composite particles, in which the carbon black neutralized with potassium hydroxide was covered with the carboxyl group-containing styrene-acryl copolymer, in the aqueous medium.

Note that, aqueous pigment dispersion elements (cyan) were also obtained in the same manner, provided that the carbon black was replaced with copper phthalocyanine (SEIKALIGHT BLUE A612, manufactured by Dainichiseika Color & Chemicals Mfg. Co. Ltd.).

Moreover, aqueous pigment dispersion elements were also obtained in the same manner, provided that the styrene-acryl copolymer A solution was replaced with a rosin-modified maleic acid resin (R-100, manufactured by Harima chemicals Group, Inc.).

Moreover, a mixing chamber equipped with a cooling jacket was charged with 1,600 g of carbon black (Raven1080, manufactured by Birla Carbon), 800 g of the copolymer A solution obtained in Synthesis Example, and 1,957 g of water, and the mixture was stirred, and mixed. The resulting mixture was passed through a disperser (SC Mill SC100, manufactured by Nippon Coke & Engineering Co., Ltd.) filled with zirconia beads having diameters of 0.3 mm to disperse the mixture in a circulation system (a system where the dispersion liquid from the disperser was returned to the mixing chamber) for 6 hours. During this operation, the rotation number of the disperser was set at 2,700 rpm, and cold water was passed through the cooling jacket so that the temperature of the dispersion liquid was kept at 40° C. or lower. After the dispersion, the resulting dispersion liquid was taken out from the mixing chamber, to thereby obtain aqueous pigment dispersion elements dispersed in the aqueous medium.

Preparation Example 2

First, the water-soluble organic solvent, the surfactant, the penetrating agent, the pH regulator, an antiseptic-antirust agent, and water depicted in Table 1 or 2 were stirred for 1 hour to homogeneously mix. Subsequently, the defoaming agent was added to the mixture, and the resulting mixture was stirred for 1 hour to homogeneously mix. Thereafter, the aqueous pigment dispersion elements obtained in Preparation Example 1 were added, and the resulting mixture was stirred for 1 hour to homogeneously mix. The resulting mixture was filtered with a polyvinylidene fluoride membrane filter having the average pore diameter of 0.8 μm under the pressure to remove coarse particles or dusts, to thereby obtain an aqueous recording ink. Note that, in the aqueous recording ink, the colorant was added in such a ratio that the solid content of the aqueous pigment dispersion elements obtained in Preparation Example 1 was to be 8% by mass. Note that, the unit of the value of each component depicted in Tables 1 and 2 is part(s) by mass.

Note that, in Examples below, the colorant is carbon black. In Examples 1 to 13, 15 to 16, and 17 to 34, the carboxyl group-containing resin is the styrene-acryl resin. In Examples 1 to 13, 15, and 17 to 34, the carbon black used as the colorant is composite particles coated with the carboxyl group-containing styrene-acryl copolymer. In Example 16, the carbon black used as the colorant is dispersed in the copolymer. In Comparative Examples below, the carbon black used as the colorant is composite particles coated with the carboxyl group-containing styrene-acryl copolymer.

Examples 1 to 16, and Comparative Examples 1 to 7

Preparation of Treatment Liquid

The various materials depicted in Table 1, such as Cationic Resin 1 (UNISENCE FPA100L, manufactured by SENKA Corporation, the weight average molecular weight: 6,000, the cationization degree: 4.06 meq/g), Cationic Resin 2 (UNISENCE FPA101L, manufactured by SENKA Corporation, the weight average molecular weight: 25,000, the cationization degree: 5.81 meq/g), Cationic Resin 3 (PAS-H-1L, manufactured by Nitto Boseki Co., Ltd., the weight average molecular weight: 8,500, the cationization degree: 5.76 meq/g), Cationic Resin 4 (G5615, manufactured by DAI-ICHI KOGYO SEIYAKU CO., LTD., the weight average molecular weight: 4,000, the cationization degree: 5.89 meq/g), Cationic Resin 5 (PAS-A-5, manufactured by Nitto Boseki Co., Ltd., the weight average molecular weight: 4,000, the cationization degree: 3.73), Cationic Resin 6 (Catiomaster PDT-2, manufactured by Yokkaichi Chemical Company, Limited, the weight average molecular weight: 3,500, the cationization degree: 7.33 meq/g), the water-soluble organic solvent, and water were stirred for 1 hour to homogeneously mix, to thereby obtain a treatment liquid.

Note that, Cationic Resins 1 to 4 are each a cationic resin having the repeating unit represented by the structural formula 1, Cationic Resin 5 is a cationic resin having the repeating unit represented by the following structural formula 7, and Cationic Resin 6 is a cationic resin having the repeating unit represented by the structural formula 2.

Structural Formula 7

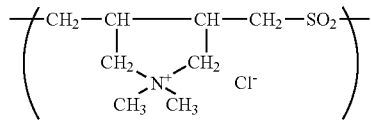

<Printing Method>

The predetermined amount of the treatment liquid of each of Examples 1 to 14 and Comparative Examples 1 to 7, which was prepared by mixing the materials depicted as the formulation of the treatment liquid, was uniformly applied on a recording medium (OK Topcoat+, manufactured by Oji Paper Co., Ltd.) by means of a wire bar (coil diameter: 0.05 mm) manufactured by Kobayashi Manufacture Co., Ltd. Thereafter, drying was optionally performed at 80° C. for 30 seconds.

Subsequently, the aqueous recording ink was ejected onto the recording medium by means of an inkjet recording device (IPSIO GXe5500, manufactured by Ricoh Company Limited), to thereby obtain a print sample. Note that, as for a printing chart, a solid image in the shape of a square having a side of 3 cm, which was composed of a dot pattern, was used.

In Example 15, the aqueous recording ink was ejected onto a recording medium (OK Topcoat+, manufactured by Oji Paper Co., Ltd.) by means of the inkjet recording device (IPSIO GXe5500, manufactured by Ricoh Company Limited) to perform printing, followed by uniformly applying the predetermined amount of the treatment liquid on the recording medium using a wire bar (coil diameter: 0.05 mm) manufactured by Kobayashi Manufacture Co., Ltd. Thereafter, drying was performed at 80° C. for 30 seconds.

The above-obtained print sample, the recording ink, and the treatment liquid were evaluated in terms of the various properties thereof, in the following manners.

<Image Density>

The solid part of the solid image, which was a square having a side of 3 cm, and composed of a dot pattern, was measured by means of a spectrophotometer (939), manufactured by X-Rite Inc. Note that, the image density is more preferable, as the value is higher.

<Beading>

The solid part of the solid image, which was a square having a side of 3 cm, and composed of a dot pattern, was visually observed, and the level of beading was ranked from 1 to 5. The larger the value is, the more preferable in terms of prevention of beading. Ranks 1 and 2 are levels, which are judged as problematic.

5: No beading was observed.

4: Beading was very slightly observed, but it was not problematic (level where beading could not be recognized unless being gazed).

3: Beading was slightly observed, but it was not problematic.

2: Beading was observed, and it was a level where beading could be clearly observed with naked eyes (problematic level).

1: Beading was significantly observed (the same level as when the treatment liquid was not applied).

<Transfer Density (Abrasion Resistance)>

The solid part of the solid image, which was a square having a side of 3 cm, and composed of a dot pattern, was rubbed with a cloth attached onto a clock meter (manufactured by TOYO SEIKI SEISAKU-SHO, LTD.) and the transfer density of the ink on the cloth after rubbing was measured using a spectrophotometer (939), manufactured by X-Rite Inc. The lower the transfer density is, the more preferable the fixing ability of the image is.

<Friction Coefficient>

The treatment liquid of each of Comparative Examples 1 to 7 and Examples 1 to 16, which was prepared by mixing the materials based on the formulation as depicted, was applied on a recording medium, followed by performing drying under the conditions as depicted in Table 1. The resulting recording medium was attached to A surface property tester (TYPE: 14FW) manufactured by SHINTO Scientific Co., Ltd., followed by load of 800 g was applied, and the recording medium was abraded against another recording medium. The maximum value of the friction coefficient (static friction coefficient) during the abrasion was measured. Note that, the smaller the value of the friction coefficient is, more preferable the result is. When the value of the friction coefficient is 1.0 or greater, a tear of the recording medium becomes significant.

<Curling>

The treatment liquid of each of Comparative Examples 1 to 7 and Examples 1 to 16, which was prepared by mixing the materials based on the formulation as depicted, was applied on a recording medium. Ten seconds after the application of the treatment liquid, the curled value of the recording medium was measured.

<Precipitation of Crystals>

One drop of the treatment liquid of each of Comparative Examples 1 to 7 and Examples 1 to 16, which was prepared by mixing the materials based on the formulation as depicted, was dripped on a glass plate, followed by drying at 50° C. for 1 hour. After the drying, a level of the precipitation of crystals was visually observed, and ranked into the following 3 levels.

A: No precipitation was observed.
B: the precipitation was slightly observed, but it was not a problematic level.
C: The precipitation was observed.

<Corrosion of Metal Member>
A metal member (SUS303) was immersed in 30 mL of the treatment liquid, and then left in a thermostat set to 50° C. for 3 weeks. After the standing, the corrosion level of the metal member was visually observed, and ranked into the following 3 levels.
A: No corrosion was observed.
B: The corrosion was slightly observed, but it was not a problematic level.
C: The corrosion was observed.

TABLE 1-1-1

|  |  |  | Ex. 1 | Ex. 2 | Ex. 3 | Ex. 4 |
|---|---|---|---|---|---|---|
| Aqueous recording ink | Colorant | Carbon black | 8.0 | 8.0 | 8.0 | 8.0 |
|  |  | Copper phthalocyanine |  |  |  |  |
|  | Carboxy group-containing resin | Styrene-acryl resin | 2.0 | 2.0 | 2.0 | 2.0 |
|  |  | Rosin-modifed maleic resin |  |  |  |  |
|  | Water-soluble organic solvent | Glycerin | 23.0 | 23.0 | 23.0 | 23.0 |
|  |  | 1,3-butanediol | 11.0 | 11.0 | 11.0 | 11.0 |
|  | Surfactant | Surfactant of structural formula 6 | 0.4 | 0.4 | 0.4 | 0.4 |
|  | Defoaming agent | N-octyl-2-pyrrolidone | 1.2 | 1.2 | 1.2 | 1.2 |
|  | Penetrating agent | 1,2-octanediol | 2.0 | 2.0 | 2.0 | 2.0 |
|  | pH regulator | 2-amino-2-ethyl-1,3-propanediol | 0.5 | 0.5 | 0.5 | 0.5 |
|  | Antiseptic antirust agent | Antiseptic antimold agent | 0.1 | 0.1 | 0.1 | 0.1 |
|  | Water | Ion-exchanged water | 51.8 | 51.8 | 51.8 | 51.8 |
|  | Total |  | 100.0 | 100.0 | 100.0 | 100.0 |
| Treatment liquid | Cationic Resin | Cationic Resin 1 | 4.5 | 9.0 | 31.5 | 45.0 |
|  |  | Cationic Resin 2 | 0.5 | 1.0 | 3.5 | 5.0 |
|  |  | Cationic Resin 3 |  |  |  |  |
|  |  | Cationic Resin 4 |  |  |  |  |
|  |  | Cationic Resin 5 |  |  |  |  |
|  |  | Cationic Resin 6 |  |  |  |  |
|  | Water-soluble organic solvent | Glycerin | 18.0 | 15.0 | 5.0 | 5.0 |
|  |  | 1,3-butanediol | 18.0 | 15.0 | 5.0 | 5.0 |
|  | Surfactant | Surfactant of structural formula 3 | 0.25 | 0.25 | 0.25 | 0.25 |
|  | Defoaming agent | 2,4,7,9-tetramethyldecane-4,7-diol | 1.0 | 1.0 | 1.0 | 1.0 |
|  | pH regulator | 2-amino-2-ethyl-1,3-propanediol | 0.5 | 0.5 | 0.5 | 0.5 |
|  | Antiseptic antirust agent | Antiseptic antimold agent | 0.1 | 0.1 | 0.1 | 0.1 |
|  | Water | Ion-exchanged water | 57.2 | 58.2 | 53.2 | 38.2 |
|  | Total |  | 100.0 | 100.0 | 100.0 | 100.0 |
| Deposition amount of treatment liquid (dry basis) [g/m$^2$] |  |  | 0.5 | 0.5 | 0.5 | 0.5 |
| Drying (80° C., 30 seconds) |  |  | Yes | Yes | Yes | Yes |
| Evaluation items |  | Image density | 1.09 | 1.15 | 1.29 | 1.32 |
|  |  | Beading | 3 | 4 | 5 | 5 |
|  |  | Abrasion resistance (transfer density) | 0.18 | 0.19 | 0.21 | 0.22 |
|  |  | Friction coefficient | 0.20 | 0.22 | 0.51 | 0.77 |
|  |  | Curling [mm] | 30 | 30 | 32 | 23 |
|  |  | Precipitation of crystals | A | A | B | B |
|  |  | Corrosion of metal member | A | A | A | A |

TABLE 1-1-2

|  |  |  | Ex. 5 | Ex. 6 | Ex. 7 | Ex. 8 | Ex. 9 |
|---|---|---|---|---|---|---|---|
| Aqueous recording ink | Colorant | Carbon black | 8.0 | 8.0 | 8.0 | 8.0 | 8.0 |
|  |  | Copper phthalocyanine |  |  |  |  |  |
|  | Carboxy group-containing resin | Styrene-acryl resin | 2.0 | 2.0 | 2.0 | 2.0 | 2.0 |
|  |  | Rosin-modifed maleic resin |  |  |  |  |  |
|  | Water-soluble organic solvent | Glycerin | 23.0 | 23.0 | 23.0 | 23.0 | 23.0 |
|  |  | 1,3-butanediol | 11.0 | 11.0 | 11.0 | 11.0 | 11.0 |
|  | Surfactant | Surfactant of structural formula 6 | 0.4 | 0.4 | 0.4 | 0.4 | 0.4 |
|  | Defoaming agent | N-octyl-2-pyrrolidone | 1.2 | 1.2 | 1.2 | 1.2 | 1.2 |
|  | Penetrating agent | 1,2-octanediol | 2.0 | 2.0 | 2.0 | 2.0 | 2.0 |
|  | pH regulator | 2-amino-2-ethyl-1,3-propanediol | 0.5 | 0.5 | 0.5 | 0.5 | 0.5 |
|  | Antiseptic antirust agent | Antiseptic antimold agent | 0.1 | 0.1 | 0.1 | 0.1 | 0.1 |
|  | Water | Ion-exchanged water | 51.8 | 51.8 | 51.8 | 51.8 | 51.8 |
|  | Total |  | 100.0 | 100.0 | 100.0 | 100.0 | 100.0 |
| Treatment liquid | Cationic Resin | Cationic Resin 1 | 49.5 | 31.5 | 30.0 | 31.5 | 31.5 |
|  |  | Cationic Resin 2 | 5.5 | 3.5 | 1.5 | 3.5 | 3.5 |

TABLE 1-1-2-continued

|  |  |  | Ex. 5 | Ex. 6 | Ex. 7 | Ex. 8 | Ex. 9 |
|---|---|---|---|---|---|---|---|
|  |  | Cationic Resin 3 |  |  |  | 3.5 |  |
|  |  | Cationic Resin 4 |  |  |  |  |  |
|  |  | Cationic Resin 5 |  |  |  |  |  |
|  |  | Cationic Resin 6 |  | 1.0 | 1.0 | 1.0 | 1.0 |
|  | Water-soluble organic solvent | Glycerin | 2.5 | 5.0 | 5.0 | 5.0 | 5.0 |
|  |  | 1,3-butanediol | 2.5 | 5.0 | 5.0 | 5.0 | 5.0 |
|  | Surfactant | Surfactant of structural formula 3 | 0.25 | 0.25 | 0.25 | 0.25 | 0.25 |
|  | Defoaming agent | 2,4,7,9-tetramethyldecane-4,7-diol | 1.0 | 1.0 | 1.0 | 1.0 | 1.0 |
|  | pH regulator | 2-amino-2-ethyl-1,3-propanediol | 0.5 | 0.5 | 0.5 | 0.5 | 0.5 |
|  | Antiseptic antirust agent | Antiseptic antimold agent | 0.1 | 0.1 | 0.1 | 0.1 | 0.1 |
|  | Water | Ion-exchanged water | 38.2 | 52.2 | 52.2 | 52.2 | 52.2 |
|  | Total |  | 100.0 | 100.0 | 100.0 | 100.0 | 100.0 |
| Deposition amount of treatment liquid (dry basis) [g/m$^2$] |  |  | 0.5 | 0.5 | 0.5 | 0.5 | 0.3 |
| Drying (80° C., 30 seconds) |  |  | Yes | Yes | Yes | No | Yes |
| Evaluation items |  | Image density | 1.29 | 1.31 | 1.30 | 1.29 | 1.20 |
|  |  | Beading | 5 | 5 | 5 | 4 | 3 |
|  |  | Abrasion resistance (transfer density) | 0.24 | 0.20 | 0.22 | 0.24 | 0.17 |
|  |  | Friction coefficient | 0.83 | 0.71 | 0.42 | 0.66 | 0.55 |
|  |  | Curling [mm] | 26 | 30 | 30 | 31 | 28 |
|  |  | Precipitation of crystals | B | A | A | A | A |
|  |  | Corrosion of metal member | B | A | A | A | A |

TABLE 1-1-3

|  |  |  | Ex. 10 | Ex. 11 | Ex. 12 | Ex. 13 | Ex. 14 |
|---|---|---|---|---|---|---|---|
| Aqueous recording ink | Colorant | Carbon black | 8.0 | 8.0 | 8.0 | 8.0 |  |
|  |  | Copper phthalocyanine |  |  |  |  | 8.0 |
|  | Carboxy group-containing resin | Styrene-acryl resin | 2.0 | 2.0 | 2.0 |  | 2.0 |
|  |  | Rosin-modifed maleic resin |  |  |  | 2.0 |  |
|  | Water-soluble organic solvent | Glycerin | 23.0 | 23.0 | 23.0 | 23.0 | 23.0 |
|  |  | 1,3-butanediol | 11.0 | 11.0 | 11.0 | 11.0 | 11.0 |
|  | Surfactant | Surfactant of structural formula 6 | 0.4 | 0.4 | 0.4 | 0.4 | 0.4 |
|  | Defoaming agent | N-octyl-2-pyrrolidone | 1.2 | 1.2 | 1.2 | 1.2 | 1.2 |
|  | Penetrating agent | 1,2-octanediol | 2.0 | 2.0 | 2.0 | 2.0 | 2.0 |
|  | pH regulator | 2-amino-2-ethyl-1,3-propanediol | 0.5 | 0.5 | 0.5 | 0.5 | 0.5 |
|  | Antiseptic antirust agent | Antiseptic antimold agent | 0.1 | 0.1 | 0.1 | 0.1 | 0.1 |
|  | Water | Ion-exchanged water | 51.8 | 51.8 | 51.8 | 51.8 | 51.8 |
|  | Total |  | 100.0 | 100.0 | 100.0 | 100.0 | 100.0 |
| Treatment liquid | Cationic Resin | Cationic Resin 1 | 31.5 | 31.5 | 31.5 | 31.5 | 31.5 |
|  |  | Cationic Resin 2 | 3.5 | 3.5 | 3.5 | 3.5 | 3.5 |
|  |  | Cationic Resin 3 |  |  |  |  |  |
|  |  | Cationic Resin 4 |  |  |  |  |  |
|  |  | Cationic Resin 5 |  |  |  |  |  |
|  |  | Cationic Resin 6 | 1.0 | 1.0 | 1.0 | 1.0 | 1.0 |
|  | Water-soluble organic solvent | Glycerin | 5.0 | 5.0 | 5.0 | 5.0 | 5.0 |
|  |  | 1,3-butanediol | 5.0 | 5.0 |  | 5.0 | 5.0 |
|  | Surfactant | Surfactant of structural formula 3 | 0.25 | 0.25 |  | 0.25 | 0.25 |
|  | Defoaming agent | 2,4,7,9-tetramethyldecane-4,7-diol | 1.0 | 1.0 |  | 1.0 | 1.0 |
|  | pH regulator | 2-amino-2-ethyl-1,3-propanediol | 0.5 | 0.5 | 0.5 | 0.5 | 0.5 |
|  | Antiseptic antirust agent | Antiseptic antimold agent | 0.1 | 0.1 | 0.1 | 0.1 | 0.1 |
|  | Water | Ion-exchanged water | 52.2 | 52.2 | 53.4 | 52.2 | 52.2 |
|  | Total |  | 100.0 | 100.0 | 100.0 | 100.0 | 100.0 |
| Deposition amount of treatment liquid (dry basis) [g/m$^2$] |  |  | 2.0 | 2.5 | 0.5 | 0.5 | 0.5 |
| Drying (80° C., 30 seconds) |  |  | Yes | Yes | Yes | Yes | Yes |
| Evaluation items |  | Image density | 1.33 | 1.34 | 1.34 | 1.29 | 1.22 |
|  |  | Beading | 5 | 5 | 5 | 5 | 5 |
|  |  | Abrasion resistance (transfer density) | 0.23 | 0.24 | 0.23 | 0.20 | 0.20 |
|  |  | Friction coefficient | 0.93 | 1.11 | 0.88 | 0.71 | 0.71 |
|  |  | Curling [mm] | 35 | 39 | 29 | 32 | 29 |
|  |  | Precipitation of crystals | A | A | A | A | A |
|  |  | Corrosion of metal member | A | A | A | A | A |

TABLE 1-2-1

|  |  |  | Ex. 15 | Ex. 16 | Comp. Ex. 1 | Comp. Ex. 2 | Comp. Ex. 3 |
| --- | --- | --- | --- | --- | --- | --- | --- |
| Aqueous recording ink | Colorant | Carbon black | 8.0 | 8.0 | 8.0 | 8.0 | 8.0 |
|  |  | Copper phthalocyanine |  |  |  |  |  |
|  | Carboxy group-containing resin | Styrene-acryl resin | 2.0 | 2.0 | 2.0 | 2.0 | 2.0 |
|  |  | Rosin-modifed maleic resin |  |  |  |  |  |
|  | Water-soluble organic solvent | Glycerin | 23.0 | 23.0 | 23.0 | 23.0 | 23.0 |
|  |  | 1,3-butanediol | 11.0 | 11.0 | 11.0 | 11.0 | 11.0 |
|  | Surfactant | Surfactant of structural formula 6 | 0.4 | 0.4 | 0.4 | 0.4 | 0.4 |
|  | Defoaming agent | N-octyl-2-pyrrolidone | 1.2 | 1.2 | 1.2 | 1.2 | 1.2 |
|  | Penetrating agent | 1,2-octanediol | 2.0 | 2.0 | 2.0 | 2.0 | 2.0 |
|  | pH regulator | 2-amino-2-ethyl-1,3-propanediol | 0.5 | 0.5 | 0.5 | 0.5 | 0.5 |
|  | Antiseptic antirust agent | Antiseptic antimold agent | 0.1 | 0.1 | 0.1 | 0.1 | 0.1 |
|  | Water | Ion-exchanged water | 51.8 | 51.8 | 51.8 | 51.8 | 51.8 |
|  | Total |  | 100.0 | 100.0 | 100.0 | 100.0 | 100.0 |
| Treatment liquid | Cationic Resin | Cationic Resin 1 | 31.5 | 31.5 |  | 35.0 |  |
|  |  | Cationic Resin 2 | 3.5 | 3.5 |  |  | 20.0 |
|  |  | Cationic Resin 3 |  |  |  |  |  |
|  |  | Cationic Resin 4 |  |  |  |  |  |
|  |  | Cationic Resin 5 |  |  |  |  |  |
|  |  | Cationic Resin 6 |  |  |  |  |  |
|  | Water-soluble organic solvent | Glycerin | 5.0 | 5.0 | 20.0 | 5.0 | 5.0 |
|  |  | 1,3-butanediol | 5.0 | 5.0 | 20.0 | 5.0 | 5.0 |
|  | Surfactant | Surfactant of structural formula 3 | 0.25 | 0.25 | 0.25 | 0.25 | 0.25 |
|  | Defoaming agent | 2,4,7,9-tetramethyldecane-4,7-diol | 1.0 | 1.0 | 1.0 | 1.0 | 1.0 |
|  | pH regulator | 2-amino-2-ethyl-1,3-propanediol | 0.5 | 0.5 | 0.5 | 0.5 | 0.5 |
|  | Antiseptic antirust agent | Antiseptic antimold agent | 0.1 | 0.1 | 0.1 | 0.1 | 0.1 |
|  | Water | Ion-exchanged water | 53.2 | 53.2 | 58.2 | 53.2 | 68.2 |
|  | Total |  | 100.0 | 100.0 | 100.0 | 100.0 | 100.0 |
| Deposition amount of treatment liquid (dry basis) [g/m$^2$] |  |  | 0.5 | 0.5 | 0.5 | 0.5 | 0.5 |
| Drying (80° C., 30 seconds) |  |  | Yes | Yes | Yes | Yes | Yes |
| Evaluation items | Image density |  | 1.21 | 1.24 | 0.95 | 1.20 | 1.17 |
|  | Beading |  | 4 | 4 | 1 | 5 | 4 |
|  | Abrasion resistance (transfer density) |  | 0.17 | 0.25 | 0.18 | 0.25 | 0.23 |
|  | Friction coefficient |  | 0.51 | 0.51 | 0.20 | 1.12 | 1.35 |
|  | Curling [mm] |  | 32 | 32 | 38 | 34 | 47 |
|  | Precipitation of crystals |  | B | B | A | C | C |
|  | Corrosion of metal member |  | A | A | A | A | A |

TABLE 1-2-2

|  |  |  | Comp. Ex. 4 | Comp. Ex. 5 | Comp. Ex. 6 | Comp. Ex. 7 |
| --- | --- | --- | --- | --- | --- | --- |
| Aqueous recording ink | Colorant | Carbon black | 8.0 | 8.0 | 8.0 | 8.0 |
|  |  | Copper phthalocyanine |  |  |  |  |
|  | Carboxy group-containing resin | Styrene-acryl resin | 2.0 | 2.0 | 2.0 | 2.0 |
|  |  | Rosin-modifed maleic resin |  |  |  |  |
|  | Water-soluble organic solvent | Glycerin | 23.0 | 23.0 | 23.0 | 23.0 |
|  |  | 1,3-butanediol | 11.0 | 11.0 | 11.0 | 11.0 |
|  | Surfactant | Surfactant of structural formula 6 | 0.4 | 0.4 | 0.4 | 0.4 |
|  | Defoaming agent | N-octyl-2-pyrrolidone | 1.2 | 1.2 | 1.2 | 1.2 |
|  | Penetrating agent | 1,2-octanediol | 2.0 | 2.0 | 2.0 | 2.0 |
|  | pH regulator | 2-amino-2-ethyl-1,3-propanediol | 0.5 | 0.5 | 0.5 | 0.5 |
|  | Antiseptic antirust agent | Antiseptic antimold agent | 0.1 | 0.1 | 0.1 | 0.1 |
|  | Water | Ion-exchanged water | 51.8 | 51.8 | 51.8 | 51.8 |
|  | Total |  | 100.0 | 100.0 | 100.0 | 100.0 |
| Treatment liquid | Cationic Resin | Cationic Resin 1 |  |  | 35.0 |  |
|  |  | Cationic Resin 2 |  |  |  |  |
|  |  | Cationic Resin 3 |  |  |  |  |
|  |  | Cationic Resin 4 | 35.0 |  |  |  |
|  |  | Cationic Resin 5 |  | 35.0 |  |  |
|  |  | Cationic Resin 6 |  |  | 1.0 | 35.0 |
|  | Water-soluble organic solvent | Glycerin | 5.0 | 5.0 | 5.0 | 5.0 |
|  |  | 1,3-butanediol | 5.0 | 5.0 | 5.0 | 5.0 |
|  | Surfactant | Surfactant of structural formula 3 | 0.25 | 0.25 | 0.25 | 0.25 |

TABLE 1-2-2-continued

|  |  | Comp. Ex. 4 | Comp. Ex. 5 | Comp. Ex. 6 | Comp. Ex. 7 |
|---|---|---|---|---|---|
| Defoaming agent | 2,4,7,9-tetramethyldecane-4,7-diol | 1.0 | 1.0 | 1.0 | 1.0 |
| pH regulator | 2-amino-2-ethyl-1,3-propanediol | 0.5 | 0.5 | 0.5 | 0.5 |
| Antiseptic antirust agent | Antiseptic antimold agent | 0.1 | 0.1 | 0.1 | 0.1 |
| Water | Ion-exchanged water | 53.2 | 53.2 | 52.2 | 53.2 |
| Total |  | 100.0 | 100.0 | 100.0 | 100.0 |
| Deposition amount of treatment liquid (dry basis) [g/m$^2$] |  | 0.5 | 0.5 | 0.5 | 0.5 |
| Drying (80° C., 30 seconds) |  | Yes | Yes | Yes | Yes |
| Evaluation items | Image density | 1.22 | 1.08 | 1.22 | 1.25 |
|  | Beading | 5 | 2 | 5 | 5 |
|  | Abrasion resistance (transfer density) | 0.28 | 0.18 | 0.23 | 0.33 |
|  | Friction coefficient | 1.15 | 1.15 | 1.34 | 0.45 |
|  | Curling [mm] | 32 | 34 | 30 | 35 |
|  | Precipitation of crystals | C | C | A | A |
|  | Corrosion of metal member | C | C | B | C |

In Tables 1-1-1 to 1-2-2, the rosin-modified maleic acid resin is R-100 manufactured by Harima Chemicals Group, Inc., the antiseptic antimold agent is LV(S) manufactured by Avecia Ltd., and the surfactants represented by the structural formulae 6 and 3 are UNIDYNE DSN403N manufactured by DAIKIN INDUSTRIES, LTD.

Examples 1 to 16 indicate that effects, such as the improvement of the image density, the improvement in the beading resistance, the reduction in the friction coefficient between the recording media, and reduction in the corrosion level of the metal member, can be attained by using the treatment liquid, which contains two or more cationic resins having the cationization degree of 4 meq/g or greater at the pH of 4.0, each having mutually different molecular weight in the range of 5,000 to 25,000, and each having the repeating unit represented by the structural formula 1.

Examples 6 to 14 indicate that effects, such as the improvement of the image density, the improvement in the beading resistant, and the reduction in the precipitation level of crystals, can be attained by using the treatment liquid, which further contains a cationic resin having the cationization degree of 4 meq/g or greater at the pH of 4.0, and having the repeating unit represented by the structural formula 2.

Examples 1 to 7 indicate that effects, such as the improvement of the image density, and the improvement in the beading resistance, can be attained by adding the cationic resins to the treatment liquid in a manner that the amount of the cationic resins is 10% by mass to 50% by mass.

Examples 1 to 16 indicate that effects, such as the improvement of the image density, and the improvement in the beading resistance, can be attained by using the aqueous recording ink, which contains at least the colorant, the water-soluble organic solvent, the surfactant, and the water, where the colorant is dispersed in the carboxyl group-containing resin, or microcapsulated with the carboxyl group-containing resin, and using the treatment liquid of the present invention.

Examples 6 and 9 to 11 indicate that effects, such as the improvement of the image density, and the improvement in the beading resistance, can be attained by applying the treatment liquid in a manner that the amount of the treatment liquid applied is 0.5 g/m$^2$ to 2 g/m$^2$ on dry basis.

Examples 6 and 7 indicate that effects, such as the improvement of the image density, and the improvement in the beading resistance can be attained by performing the drying after the application of the treatment liquid.

Example 15 indicates that the effects obtainable by the present invention can be attained even when the treatment liquid is applied after ejecting the ink, although the results of the image density, and the beading rank are slightly worse compared to a case where the treatment liquid is applied before the ejection of the ink. This is because the aggregation of the pigment is slow when the treatment liquid is applied after the ejection of the ink.

Example 16 indicates that the effects obtainable by the present invention are attained by using the ink, in which the colorant is dispersed in the carboxyl group-containing resin, although the results of the image density and the beading rank are slightly worse compared to a case where the ink, in which the colorant is microcapsulated with the carboxyl group-containing resin, is used. This is because, the ink containing the pigment dispersed in the carboxyl group-containing resin has a low existence probability of the resin adjacent to the pigment, compared to the ink containing the colorant microcapsulated with the carboxyl group-containing resin, and hence a probability of aggregating the pigment is low even when the resin containing the carboxyl group-containing resin is aggregated by the treatment liquid.

Examples 17 to 35, Comparative Examples 8 to 9

Preparation of Treatment Liquid

The various materials depicted in Table 2, such as Cationic Resin 1 (UNISENCE FPA100L, manufactured by SENKA Corporation, the weight average molecular weight: 6,000, the cationization degree: 4.06 meq/g), Cationic Resin 2 (UNISENCE FPA101L, manufactured by SENKA Corporation, the weight average molecular weight: 25,000, the cationization degree: 5.81 meq/g), Cationic Resin 3 (PAS-H-1L, manufactured by Nitto Boseki Co., Ltd., the weight average molecular weight: 8,500, the cationization degree: 5.76 meq/g), Cationic Resin 4 (G5615, manufactured by DAI-ICHI KOGYO SEIYAKU CO., LTD., the weight average molecular weight: 4,000, the cationization degree: 5.89 meq/g), Cationic Resin 5 (PAS-A-5, manufactured by Nitto Boseki Co., Ltd., the weight average molecular weight: 4,000, the cationization degree: 3.73), Cationic Resin 6 (Catiomaster PDT-2, manufactured by Yokkaichi Chemical Company, Limited, the weight average molecular weight:

3,500, the cationization degree: 7.33 meq/g), an epoxidized polyamide resin (EPA-SK01, manufactured by Yokkaichi Chemical Company, Limited), melamine formaldehyde resin (BECKAMINEAPM, manufactured by DIC Corporation), a urea resin (BECKAMINEN-80, manufactured by DIC Corporation), the water-soluble organic solvent, and water, were stirred for 1 hour to homogeneously mix, to thereby obtain a treatment liquid.

<Printing Method>

The predetermined amount of the treatment liquid of each of Examples 17 to 35 and Comparative Examples 8 to 9, which was prepared by mixing the materials depicted as the formulation of the treatment liquid, was uniformly applied on a recording medium (OK Topcoat+, manufactured by Oji Paper Co., Ltd.) by means of a wire bar (coil diameter: 0.05 mm) manufactured by Kobayashi Manufacture Co., Ltd. Thereafter, drying was optionally performed at 80° C. for 30 seconds.

Subsequently, the aqueous recording ink was ejected onto the recording medium by means of an inkjet recording device (IPSIO GXe5500, manufactured by Ricoh Company Limited), to thereby obtain a print sample. Note that, as for a printing chart, a solid image in the shape of a square having a side of 3 cm, which was composed of a dot pattern, was used.

The above-obtained print sample, the recording ink, and the treatment liquid were evaluated in terms of the various properties thereof, in the following manners.

Note that, the evaluation of the friction coefficient, the evaluation of the curling, and the presence of the precipitation of crystals were evaluated on a sample, which was prepared by applying only the treatment liquid on the recording medium.

<Image Density>

The solid part of the solid image, which was a square having a side of 3 cm, and composed of a dot pattern, was measured by means of a spectrophotometer (939), manufactured by X-Rite Inc. Note that, the image density is more preferable, as the value is higher.

<Beading>

The solid part of the solid image, which was a square having a side of 3 cm, and composed of a dot pattern, was visually observed, and the level of beading was ranked from 1 to 5. The larger the value is, the more preferable in terms of prevention of beading. Ranks 1 and 2 are levels, which are judged as problematic.

5: No beading was observed.

4: Beading was very slightly observed, but it was not problematic (level where beading could not be recognized unless being gazed).

3: Beading was slightly observed, but it was not problematic.

2: Beading was observed, and it was a level where beading could be clearly observed with naked eyes (problematic level).

1: Beading was significantly observed (the same level as when the treatment liquid was not applied).

<Transfer Density (Abrasion Resistance)>

The solid part of the solid image, which was a square having a side of 3 cm, and composed of a dot pattern, was rubbed with a cloth attached onto a clock meter (manufactured by TOYO SEIKI SEISAKU-SHO, LTD.) and the transfer density of the ink on the cloth after rubbing was measured using a spectrophotometer (939), manufactured by X-Rite Inc. The lower the transfer density is, the more preferable the fixing ability of the image is.

<Friction Coefficient>

The treatment liquid of each of Comparative Examples 8 to 9 and Examples 17 to 35, which was prepared by mixing the materials based on the formulation as depicted, was applied on a recording medium, followed by performing drying under the conditions as depicted in Table 2. The resulting recording medium was attached to A surface property tester (TYPE: 14FW) manufactured by SHINTO Scientific Co., Ltd., followed by load of 800 g was applied, and the recording medium was abraded against another recording medium. The maximum value of the friction coefficient (static friction coefficient) during the abrasion was measured. Note that, the smaller the value of the friction coefficient is, more preferable the result is. When the value of the friction coefficient is 1.0 or greater, a tear of the recording medium becomes significant.

<Curling>

The treatment liquid of each of Comparative Examples 8 to 9 and Examples 17 to 35, which was prepared by mixing the materials based on the formulation as depicted, was applied on a recording medium. Ten seconds after the application of the treatment liquid, the curled value of the recording medium was measured.

<Precipitation of Crystals>

One drop of the treatment liquid of each of Comparative Examples 8 to 9 and Examples 17 to 35, which was prepared by mixing the materials based on the formulation as depicted, was dripped on a glass plate, followed by drying at 50° C. for 1 hour. After the drying, a level of the precipitation of crystals was visually observed, and ranked into the following 3 levels.

A: No precipitation was observed.

B: the precipitation was slightly observed, but it was not a problematic level.

C: The precipitation was observed.

A metal member (SUS303) was immersed in 30 mL of the treatment liquid, and then left in a thermostat set to 50° C. for 3 weeks. After the standing, the corrosion level of the metal member was visually observed, and ranked into the following 3 levels.

A: No corrosion was observed.

B: The corrosion was slightly observed, but it was not a problematic level.

C: The corrosion was observed.

TABLE 2-1-1

|  |  |  | Ex. 17 | Ex. 18 | Ex. 19 | Ex. 20 |
|---|---|---|---|---|---|---|
| Aqueous recording ink | Colorant | Carbon black | 8.0 | 8.0 | 8.0 | 8.0 |
|  |  | Copper phthalocyanine |  |  |  |  |
|  | Carboxy group-containing resin | Styrene-acryl resin | 2.0 | 2.0 | 2.0 | 2.0 |
|  |  | Rosin-modifed maleic resin |  |  |  |  |
|  | Water-soluble organic solvent | Glycerin | 23.0 | 23.0 | 23.0 | 23.0 |
|  |  | 1,3-butanediol | 11.0 | 11.0 | 11.0 | 11.0 |
|  | Surfactant | Surfactant of structural formula 6 | 0.4 | 0.4 | 0.4 | 0.4 |

TABLE 2-1-1-continued

|  |  |  | Ex. 17 | Ex. 18 | Ex. 19 | Ex. 20 |
|---|---|---|---|---|---|---|
|  | Defoaming agent | N-octyl-2-pyrrolidone | 1.2 | 1.2 | 1.2 | 1.2 |
|  | Penetrating agent | 1,2-octanediol | 2.0 | 2.0 | 2.0 | 2.0 |
|  | pH regulator | 2-amino-2-ethyl-1,3-propanediol | 0.5 | 0.5 | 0.5 | 0.5 |
|  | Antiseptic antirust agent | Antiseptic antimold agent | 0.1 | 0.1 | 0.1 | 0.1 |
|  | Water | Ion-exchanged water | 51.8 | 51.8 | 51.8 | 51.8 |
|  | Total |  | 100.0 | 100.0 | 100.0 | 100.0 |
| Treatment liquid | Cationic Resin | Cationic Resin 1 | 4.5 | 9.0 | 31.5 | 45.0 |
|  |  | Cationic Resin 2 | 0.5 | 1.0 | 3.5 | 5.0 |
|  |  | Cationic Resin 3 |  |  |  |  |
|  |  | Cationic Resin 4 |  |  |  |  |
|  |  | Cationic Resin 5 |  |  |  |  |
|  |  | Cationic Resin 6 |  |  |  |  |
|  | Water-soluble organic solvent | Glycerin | 18.0 | 15.0 | 5.0 | 5.0 |
|  |  | 1,3-butanediol | 18.0 | 15.0 | 5.0 | 5.0 |
|  | Fixing, anti-curl resin | Epoxidized polyamide resin | 5.0 | 5.0 | 5.0 | 5.0 |
|  |  | Melamine formaldehyde resin |  |  |  |  |
|  |  | Urea resin |  |  |  |  |
|  | Surfactant | Surfactant of structural formula 3 | 0.25 | 0.25 | 0.25 | 0.25 |
|  | Defoaming agent | 2,4,7,9-tetramethyldecane-4,7-diol | 1.0 | 1.0 | 1.0 | 1.0 |
|  | pH regulator | 2-amino-2-ethyl-1,3-propanediol | 0.5 | 0.5 | 0.5 | 0.5 |
|  | Antiseptic antirust agent | Antiseptic antimold agent | 0.1 | 0.1 | 0.1 | 0.1 |
|  | Water | Ion-exchanged water | 52.2 | 53.2 | 48.2 | 33.2 |
|  | Total |  | 100.0 | 100.0 | 100.0 | 100.0 |
| Deposition amount of treatment liquid (dry basis) [g/m$^2$] |  |  | 0.5 | 0.5 | 0.5 | 0.5 |
| Drying (80° C., 30 seconds) |  |  | Yes | Yes | Yes | Yes |
| Evaluation items |  | Image density | 1.09 | 1.15 | 1.29 | 1.32 |
|  |  | Beading | 3 | 4 | 5 | 5 |
|  |  | Abrasion resistance (transfer density) | 0.08 | 0.10 | 0.12 | 0.11 |
|  |  | Friction coefficient | 0.20 | 0.22 | 0.51 | 0.77 |
|  |  | Curling [mm] | 19 | 18 | 18 | 10 |
|  |  | Precipitation of crystals | A | A | B | B |
|  |  | Corrosion of metal member | A | A | A | A |

TABLE 2-1-2

|  |  |  | Ex. 21 | Ex. 22 | Ex. 23 | Ex. 24 |
|---|---|---|---|---|---|---|
| Aqueous recording ink | Colorant | Carbon black | 8.0 | 8.0 | 8.0 | 8.0 |
|  |  | Copper phthalocyanine |  |  |  |  |
|  | Carboxy group-containing resin | Styrene-acryl resin | 2.0 | 2.0 | 2.0 | 2.0 |
|  |  | Rosin-modifed maleic resin |  |  |  |  |
|  | Water-soluble organic solvent | Glycerin | 23.0 | 23.0 | 23.0 | 23.0 |
|  |  | 1,3-butanediol | 11.0 | 11.0 | 11.0 | 11.0 |
|  | Surfactant | Surfactant of structural formula 6 | 0.4 | 0.4 | 0.4 | 0.4 |
|  | Defoaming agent | N-octyl-2-pyrrolidone | 1.2 | 1.2 | 1.2 | 1.2 |
|  | Penetrating agent | 1,2-octanediol | 2.0 | 2.0 | 2.0 | 2.0 |
|  | pH regulator | 2-amino-2-ethyl-1,3-propanediol | 0.5 | 0.5 | 0.5 | 0.5 |
|  | Antiseptic antirust agent | Antiseptic antimold agent | 0.1 | 0.1 | 0.1 | 0.1 |
|  | Water | Ion-exchanged water | 51.8 | 51.8 | 51.8 | 51.8 |
|  | Total |  | 100.0 | 100.0 | 100.0 | 100.0 |
| Treatment liquid | Cationic Resin | Cationic Resin 1 | 49.5 | 31.5 | 30.0 | 31.5 |
|  |  | Cationic Resin 2 | 5.5 | 3.5 | 1.5 | 3.5 |
|  |  | Cationic Resin 3 |  |  | 3.5 |  |
|  |  | Cationic Resin 4 |  |  |  |  |
|  |  | Cationic Resin 5 |  |  |  |  |
|  |  | Cationic Resin 6 |  | 1.0 | 1.0 | 1.0 |
|  | Water-soluble organic solvent | Glycerin | 2.5 | 5.0 | 5.0 | 5.0 |
|  |  | 1,3-butanediol | 2.5 | 5.0 | 5.0 | 5.0 |
|  | Fixing, anti-curl resin | Epoxidized polyamide resin | 5.0 | 5.0 | 5.0 |  |
|  |  | Melamine formaldehyde resin |  |  |  |  |
|  |  | Urea resin |  |  |  | 5.0 |
|  | Surfactant | Surfactant of structural formula 3 | 0.25 | 0.25 | 0.25 | 0.25 |
|  | Defoaming agent | 2,4,7,9-tetramethyldecane-4,7-diol | 1.0 | 1.0 | 1.0 | 1.0 |

TABLE 2-1-2-continued

|  |  |  | Ex. 21 | Ex. 22 | Ex. 23 | Ex. 24 |
|---|---|---|---|---|---|---|
|  | pH regulator | 2-amino-2-ethyl-1,3-propanediol | 0.5 | 0.5 | 0.5 | 0.5 |
|  | Antiseptic antirust agent | Antiseptic antimold agent | 0.1 | 0.1 | 0.1 | 0.1 |
|  | Water | Ion-exchanged water | 33.2 | 47.2 | 47.2 | 47.2 |
|  | Total |  | 100.0 | 100.0 | 100.0 | 100.0 |
| Deposition amount of treatment liquid (dry basis) [g/m$^2$] |  |  | 0.5 | 0.5 | 0.5 | 0.5 |
| Drying (80° C., 30 seconds) |  |  | Yes | Yes | Yes | Yes |
| Evaluation items | Image density |  | 1.29 | 1.31 | 1.30 | 1.31 |
|  | Beading |  | 5 | 5 | 5 | 5 |
|  | Abrasion resistance (transfer density) |  | 0.15 | 0.10 | 0.12 | 0.15 |
|  | Friction coefficient |  | 0.83 | 0.71 | 0.42 | 0.71 |
|  | Curling [mm] |  | 11 | 15 | 15 | 16 |
|  | Precipitation of crystals |  | B | A | A | A |
|  | Corrosion of metal member |  | B | A | A | A |

TABLE 2-1-3

|  |  |  | Ex. 25 | Ex. 26 | Ex. 27 | Ex. 28 |
|---|---|---|---|---|---|---|
| Aqueous recording ink | Colorant | Carbon black | 8.0 | 8.0 | 8.0 | 8.0 |
|  |  | Copper phthalocyanine |  |  |  |  |
|  | Carboxy group-containing resin | Styrene-acryl resin | 2.0 | 2.0 | 2.0 | 2.0 |
|  |  | Rosin-modifed maleic resin |  |  |  |  |
|  | Water-soluble organic solvent | Glycerin | 23.0 | 23.0 | 23.0 | 23.0 |
|  |  | 1,3-butanediol | 11.0 | 11.0 | 11.0 | 11.0 |
|  | Surfactant | Surfactant of structural formula 6 | 0.4 | 0.4 | 0.4 | 0.4 |
|  | Defoaming agent | N-octyl-2-pyrrolidone | 1.2 | 1.2 | 1.2 | 1.2 |
|  | Penetrating agent | 1,2-octanediol | 2.0 | 2.0 | 2.0 | 2.0 |
|  | pH regulator | 2-amino-2-ethyl-1,3-propanediol | 0.5 | 0.5 | 0.5 | 0.5 |
|  | Antiseptic antirust agent | Antiseptic antimold agent | 0.1 | 0.1 | 0.1 | 0.1 |
|  | Water | Ion-exchanged water | 51.8 | 51.8 | 51.8 | 51.8 |
|  | Total |  | 100.0 | 100.0 | 100.0 | 100.0 |
| Treatment liquid | Cationic Resin | Cationic Resin 1 | 31.5 | 31.5 | 31.5 | 31.5 |
|  |  | Cationic Resin 2 | 3.5 | 3.5 | 3.5 | 3.5 |
|  |  | Cationic Resin 3 |  |  |  |  |
|  |  | Cationic Resin 4 |  |  |  |  |
|  |  | Cationic Resin 5 |  |  |  |  |
|  |  | Cationic Resin 6 | 1.0 | 1.0 | 1.0 | 1.0 |
|  | Water-soluble organic solvent | Glycerin | 5.0 | 5.0 | 5.0 | 5.0 |
|  |  | 1,3-butanediol | 5.0 | 5.0 | 5.0 | 5.0 |
|  | Fixing, anti-curl resin | Epoxized polyamide resin |  | 1.0 | 10.0 | 15.0 |
|  |  | Melamine formaldehyde resin |  |  |  |  |
|  |  | Urea resin | 5.0 |  |  |  |
|  | Surfactant | Surfactant of structural formula 3 | 0.25 | 0.25 | 0.25 | 0.25 |
|  | Defoaming agent | 2,4,7,9-tetramethyldecane-4,7-diol | 1.0 | 1.0 | 1.0 | 1.0 |
|  | pH regulator | 2-amino-2-ethyl-1,3-propanediol | 0.5 | 0.5 | 0.5 | 0.5 |
|  | Antiseptic antirust agent | Antiseptic antimold agent | 0.1 | 0.1 | 0.1 | 0.1 |
|  | Water | Ion-exchanged water | 47.2 | 51.2 | 42.2 | 37.2 |
|  | Total |  | 100.0 | 100.0 | 100.0 | 100.0 |
| Deposition amount of treatment liquid (dry basis) [g/m$^2$] |  |  | 0.5 | 0.5 | 0.5 | 0.5 |
| Drying (80° C., 30 seconds) |  |  | Yes | Yes | Yes | Yes |
| Evaluation items | Image density |  | 1.31 | 1.31 | 1.31 | 1.31 |
|  | Beading |  | 5 | 5 | 5 | 5 |
|  | Abrasion resistance (transfer density) |  | 0.16 | 0.16 | 0.11 | 0.14 |
|  | Friction coefficient |  | 0.71 | 0.71 | 0.71 | 0.71 |
|  | Curling [mm] |  | 17 | 20 | 12 | 10 |
|  | Precipitation of crystals |  | A | A | A | A |
|  | Corrosion of metal member |  | A | A | A | A |

TABLE 2-2-1

| | | | Ex. 29 | Ex. 30 | Ex. 31 | Ex. 32 | Ex. 33 |
|---|---|---|---|---|---|---|---|
| Aqueous recording ink | Colorant | Carbon black | 8.0 | 8.0 | 8.0 | 8.0 | 8.0 |
| | | Copper phthalocyanine | | | | | |
| | Carboxy group-containing resin | Styrene-acryl resin | 2.0 | 2.0 | 2.0 | 2.0 | 2.0 |
| | | Rosin-modifed maleic resin | | | | | |
| | Water-soluble organic solvent | Glycerin | 23.0 | 23.0 | 23.0 | 23.0 | 23.0 |
| | | 1,3-butanediol | 11.0 | 11.0 | 11.0 | 11.0 | 11.0 |
| | Surfactant | Surfactant of structural formula 6 | 0.4 | 0.4 | 0.4 | 0.4 | 0.4 |
| | Defoaming agent | N-octyl-2-pyrrolidone | 1.2 | 1.2 | 1.2 | 1.2 | 1.2 |
| | Penetrating agent | 1,2-octanediol | 2.0 | 2.0 | 2.0 | 2.0 | 2.0 |
| | pH regulator | 2-amino-2-ethyl-1,3-propanediol | 0.5 | 0.5 | 0.5 | 0.5 | 0.5 |
| | Antiseptic antirust agent | Antiseptic antimold agent | 0.1 | 0.1 | 0.1 | 0.1 | 0.1 |
| | Water | Ion-exchanged water | 51.8 | 51.8 | 51.8 | 51.8 | 51.8 |
| | Total | | 100.0 | 100.0 | 100.0 | 100.0 | 100.0 |
| Treatment liquid | Cationic Resin | Cationic Resin 1 | 31.5 | 31.5 | 31.5 | 31.5 | 31.5 |
| | | Cationic Resin 2 | 3.5 | 3.5 | 3.5 | 3.5 | 3.5 |
| | | Cationic Resin 3 | | | | | |
| | | Cationic Resin 4 | | | | | |
| | | Cationic Resin 5 | | | | | |
| | | Cationic Resin 6 | 1.0 | 1.0 | 1.0 | 1.0 | 1.0 |
| | Water-soluble organic solvent | Glycerin | 5.0 | 5.0 | 5.0 | 5.0 | 5.0 |
| | | 1,3-butanediol | 5.0 | 5.0 | 5.0 | 5.0 | 5.0 |
| | Fixing, anti-curl resin | Epoxized polyamide resin | 5.0 | 5.0 | 5.0 | 5.0 | 5.0 |
| | | Melamine formaldehyde resin | | | | | |
| | | Urea resin | | | | | |
| | Surfactant | Surfactant of structural formula 3 | 0.25 | 0.25 | 0.25 | 0.25 | |
| | Defoaming agent | 2,4,7,9-tetramethyldecane-4,7-diol | 1.0 | 10 | 1.0 | 10 | |
| | pH regulator | 2-amino-2-ethyl-1,3-propanediol | 0.5 | 0.5 | 0.5 | 0.5 | 0.5 |
| | Antiseptic antirust agent | Antiseptic antimold agent | 0.1 | 0.1 | 0.1 | 0.1 | 0.1 |
| | Water | Ion-exchanged water | 47.2 | 47.2 | 47.2 | 47.2 | 48.4 |
| | Total | | 100.0 | 100.0 | 100.0 | 100.0 | 100.0 |
| Deposition amount of treatment liquid (dry basis) [g/m$^2$] | | | 0.5 | 0.3 | 2.0 | 2.5 | 0.5 |
| Drying (80° C., 30 seconds) | | | No | Yes | Yes | Yes | Yes |
| Evaluation items | | Image density | 1.29 | 1.20 | 1.33 | 1.34 | 1.34 |
| | | Beading | 4 | 3 | 5 | 5 | 5 |
| | | Abrasion resistance (transfer density) | 0.14 | 0.18 | 0.13 | 0.14 | 0.12 |
| | | Friction coefficient | 0.66 | 0.55 | 0.93 | 1.11 | 0.88 |
| | | Curling [mm] | 19 | 11 | 20 | 24 | 13 |
| | | Precipitation of crystals | A | A | A | A | A |
| | | Corrosion of metal member | A | A | A | A | A |

TABLE 2-2-2

| | | | Ex. 34 | Ex. 35 | Comp. Ex. 8 | Comp. Ex. 9 |
|---|---|---|---|---|---|---|
| Aqueous recording ink | Colorant | Carbon black | 8.0 | | 8.0 | 8.0 |
| | | Copper phthalocyanine | | 8.0 | | |
| | Carboxy group-containing resin | Styrene-acryl resin | | 2.0 | 2.0 | 2.0 |
| | | Rosin-modifed maleic resin | 2.0 | | | |
| | Water-soluble organic solvent | Glycerin | 23.0 | 23.0 | 23.0 | 23.0 |
| | | 1,3-butanediol | 11.0 | 11.0 | 11.0 | 11.0 |
| | Surfactant | Surfactant of structural formula 6 | 0.4 | 0.4 | 0.4 | 0.4 |
| | Defoaming agent | N-octyl-2-pyrrolidone | 1.2 | 1.2 | 1.2 | 1.2 |
| | Penetrating agent | 1,2-octanediol | 2.0 | 2.0 | 2.0 | 2.0 |
| | pH regulator | 2-amino-2-ethyl-1,3-propanediol | 0.5 | 0.5 | 0.5 | 0.5 |
| | Antiseptic antirust agent | Antiseptic antimold agent | 0.1 | 0.1 | 0.1 | 0.1 |
| | Water | Ion-exchanged water | 51.8 | 51.8 | 51.8 | 51.8 |
| | Total | | 100.0 | 100.0 | 100.0 | 100.0 |
| Treatment liquid | Cationic Resin | Cationic Resin 1 | 31.5 | 31.5 | 31.5 | 17.5 |
| | | Cationic Resin 2 | 3.5 | 3.5 | | |
| | | Cationic Resin 3 | | | | |
| | | Cationic Resin 4 | | | | 17.5 |
| | | Cationic Resin 5 | | | | |
| | | Cationic Resin 6 | 1.0 | 1.0 | | |
| | Water-soluble organic solvent | Glycerin | 5.0 | 5.0 | 5.0 | 5.0 |
| | | 1,3-butanediol | 5.0 | 5.0 | 5.0 | 5.0 |

TABLE 2-2-2-continued

| | | Ex. 34 | Ex. 35 | Comp. Ex. 8 | Comp. Ex. 9 |
|---|---|---|---|---|---|
| Fixing, anti-curl resin | Epoxized polyamide resin | 5.0 | 5.0 | 5.0 | |
| | Melamine formaldehyde resin | | | | |
| | Urea resin | | | | |
| Surfactant | Surfactant of structural formula 3 | 0.25 | 0.25 | 0.25 | 0.25 |
| Defoaming agent | 2,4,7,9-tetramethyldecane-4,7-diol | 1.0 | 1.0 | 1.0 | 1.0 |
| pH regulator | 2-amino-2-ethyl-1,3-propanediol | 0.5 | 0.5 | 0.5 | 0.5 |
| Antiseptic antirust agent | Antiseptic antimold agent | 0.1 | 0.1 | 0.1 | 0.1 |
| Water | Ion-exchanged water | 47.2 | 47.2 | 48.2 | 53.2 |
| Total | | 100.0 | 100.0 | 100.0 | 100.0 |
| Deposition amount of treatment liquid (dry basis) [g/m²] | | 0.5 | 0.5 | 0.5 | 0.5 |
| Drying (80° C., 30 seconds) | | Yes | Yes | Yes | Yes |
| Evaluation items | Image density | 1.29 | 1.22 | 1.23 | 1.19 |
| | Beading | 5 | 5 | 5 | 5 |
| | Abrasion resistance (transfer density) | 0.11 | 0.12 | 0.14 | 0.24 |
| | Friction coefficient | 0.71 | 0.71 | 1.12 | 0.95 |
| | Curling [mm] | 15 | 16 | 20 | 34 |
| | Precipitation of crystals | A | A | C | C |
| | Corrosion of metal member | A | A | A | C |

In Tables 2-1-1 to 2-2-2, the rosin-modified maleic acid resin is R-100 manufactured by Harima Chemicals Group, Inc., the antiseptic antimold agent is LV(S) manufactured by Avecia Ltd., and the surfactants represented by the structural formulae 6 and 3 are UNIDYNE DSN403N manufactured by DAIKIN INDUSTRIES, LTD.

Examples 17 to 35 indicate that effects, such as the improvement of the image density, the reduction in the friction coefficient between the recording media, and the improvement in the beading resistance, can be attained by using the treatment liquid, which contains two or more cationic resins having the cationization degree of 4 meq/g or greater at the pH of 4.0, each having mutually different molecular weight in the range of 5,000 to 25,000, and each having the repeating unit represented by the structural formula 1, and further contains at least one selected from the group consisting of the epoxidized polyamide resin, the melamine formaldehyde resin, and the urea resin.

Examples 22 to 35 indicate that effects, such as the improvement of the image density, the improvement in the beading resistant, and the reduction in the precipitation level of crystals, can be attained by using the treatment liquid, which further contains a cationic resin having the cationization degree of 4 meq/g or greater at the pH of 4.0, and having the repeating unit represented by the structural formula 2.

Examples 17 to 21 indicate that effects, such as the improvement of the image density, and the improvement in the beading resistance, can be attained by adding the cationic resins to the treatment liquid in a manner that the amount of the cationic resins is 10% by mass to 50% by mass.

Examples 22 and 26 to 28 indicate that effects, such as the improvement in the abrasion resistance, and the improvement in the anti-curling properties, can be attained by adding the epoxidized polyamide resin, the melamine formaldehyde resin, or the urea resin to the treatment liquid in a manner that the amount of the epoxidized polyamide resin, the melamine formaldehyde resin, or the urea resin in the treatment liquid is 1% by mass to 10% by mass.

Examples 17 to 35 indicate that effects, such as the improvement of the image density, and the improvement in the beading resistance, can be attained by using the aqueous recording ink, which contains at least the colorant, the water-soluble organic solvent, the surfactant, and the water, where the colorant is dispersed in the carboxyl group-containing resin, or microcapsulated with the carboxyl group-containing resin, and using the treatment liquid of the present invention.

Examples 22 and 30 to 32 indicate that effects, such as the improvement of the image density, and the improvement in the beading resistance, can be attained by applying the treatment liquid in a manner that the amount of the treatment liquid applied is 0.5 g/m² to 2 g/m² on dry basis.

Examples 22 and 29 indicate that effects, such as the improvement of the image density, and the improvement in the beading resistance can be attained by performing the drying after the application of the treatment liquid.

The embodiments of the present invention are, for example, as follows:

<1> A treatment liquid, containing:

a water-soluble organic solvent;

at least two cationic resins; and water, wherein the cationic resins have a cationization degree of 4 meq/g or greater at pH of 4.0, and a repeating unit represented by the following structural formula 1:

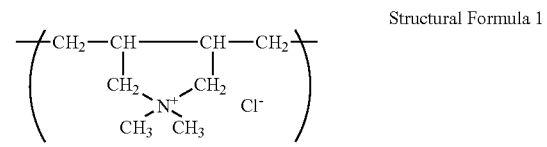

Structural Formula 1 and the cationic resins have mutually different weight average molecular weights in the range of 5,000 to 25,000.

<2> The treatment liquid according to <1>, further containing a cationic resin having a cationization degree of 4 meq/g or greater at pH of 4.0, and having the repeating unit represented by the following structural formula 2:

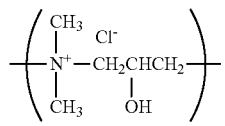

Structural Formula 2

<3> The treatment liquid according to <1> or <2>, wherein a total amount of the cationic resins contained in the treatment liquid is 10% by mass to 50% by mass.

<4> The treatment liquid according to any one of <1> to <3>, further containing an epoxidized polyamide resin, a melamine formaldehyde resin, or a urea resin, or any combination thereof.

<5> The treatment liquid according to <4>, wherein an amount of the epoxidized polyamide resin, the melamine formaldehyde resin, or the urea resin, or any combination thereof in the treatment liquid is 1% by mass to 10% by mass.

<6> The treatment liquid according to any one of <1> to <5>, wherein the treatment liquid is a treatment liquid for inkjet recording.

<7> An ink set, containing:
an aqueous recording ink; and
the treatment liquid any one of <1> to <6>,
wherein the aqueous recording ink is an aqueous recording ink containing a colorant, a water-soluble organic solvent, a surfactant, and water, where the colorant is a colorant, which is dispersed in a carboxyl group-containing resin, or micro-capsulated with a carboxyl group-containing resin.

<8> An inkjet recording method, containing:
applying the treatment liquid according to any one of <1> to <6> onto a surface of a recording medium, on which recording is performed, to treat the recording medium; and
applying an aqueous recording ink on the treated recording medium to form an image.

<9> The inkjet recording method according to <8>, wherein an amount of the treatment liquid applied is 0.5 g/m² to 2 g/m² on a dry basis.

<10> The inkjet recording method according to <8> or <9>, further containing drying the treatment liquid, after the applying the treatment liquid onto the surface of the recording medium, on which recording is performed.

This application claims priority to Japanese application No. 2014-053007, filed on Mar. 17, 2014 and incorporated herein by reference.

Structural Formula 2
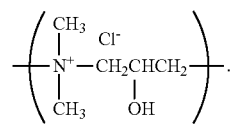

What is claimed is:

1. A treatment liquid, comprising:
a water-soluble organic solvent;
at least two cationic resins; and
water,
wherein the cationic resins have a cationization degree of 4 meq/g or greater at pH of 4.0, and a repeating unit represented by the following structural formula 1:

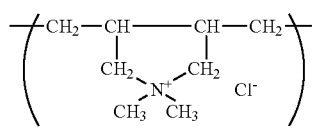

Structural Formula 1 and the cationic resins have mutually different weight average molecular weights in the range of 5,000 to 25,000, further comprising a cationic resin having a cationization degree of 4 meq/g or greater at pH of 4.0, and having the repeating unit represented by the following structural formula 2:

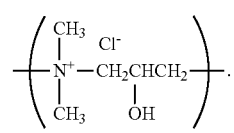

Structural Formula 2

2. The treatment liquid according to claim 1, wherein a total amount of the cationic resins contained in the treatment liquid is 10% by mass to 50% by mass.

3. The treatment liquid according to claim 1, further comprising an epoxidized polyamide resin, a melamine formaldehyde resin, or a urea resin, or any combination thereof.

4. The treatment liquid according to claim 3, wherein an amount of the epoxidized polyamide resin, the melamine formaldehyde resin, or the urea resin, or any combination thereof in the treatment liquid is 1% by mass to 10% by mass.

5. The treatment liquid according to claim 1, wherein the treatment liquid is a treatment liquid for inkjet recording.

6. An ink set, comprising:
an aqueous recording ink; and
a treatment liquid,
wherein the aqueous recording ink is an aqueous recording ink containing a colorant, a water-soluble organic solvent, a surfactant, and water, where the colorant is a colorant, which is dispersed in a carboxyl group-containing resin, or micro-capsulated with a carboxyl group-containing resin,
wherein the treatment liquid contains a water-soluble organic solvent, at least two cationic resins, and water, and
wherein the cationic resins have a cationization degree of 4 meq/g or greater at pH of 4.0, and a repeating unit represented by the following structural formula 1:

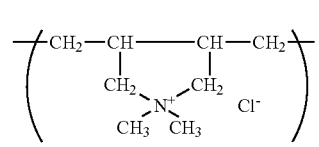

Structural Formula 1 and the cationic resins have mutually different weight average molecular weights in the range of 5,000 to 25,000, wherein the treatment liquid further comprises a cationic resin having a cationization degree of 4 meq/g or greater at pH of 4.0, and having the repeating unit represented by the following structural formula 2: